US012658732B1

(12) United States Patent (10) Patent No.: US 12,658,732 B1
Burak et al. (45) Date of Patent: Jun. 16, 2026

(54) REPLACING TRADITIONAL ENCLOSURE WITH ENCAPSULATED CIRCUITS FOR WIRELESS POWER AND DATA SYSTEMS

(71) Applicant: Energous Corporation, San Jose, CA (US)

(72) Inventors: Mallorie Burak, Eden, UT (US); Alister Hoss, Long Beach, CA (US)

(73) Assignee: ENERGOUS CORPORATION, San Jose, CA (US)

( * ) Notice: Subject to any disclaimer, the term of this patent is extended or adjusted under 35 U.S.C. 154(b) by 0 days.

(21) Appl. No.: 19/304,258

(22) Filed: Aug. 19, 2025

Related U.S. Application Data

(60) Provisional application No. 63/827,687, filed on Jun. 20, 2025.

(51) Int. Cl.
  *H02J 50/00* (2016.01)
  *H02J 50/27* (2016.01)
  *H02J 50/40* (2016.01)
  *H02J 50/80* (2016.01)
(52) U.S. Cl.
  CPC .......... *H02J 50/005* (2020.01); *H02J 50/001* (2020.01); *H02J 50/27* (2016.02); *H02J 50/40* (2016.02); *H02J 50/80* (2016.02)
(58) Field of Classification Search
  CPC .......... H01Q 9/0407; H01Q 1/52; H01Q 1/42; H02J 50/005; H02J 50/001; H02J 50/40; H02J 50/27; H02J 50/80
  See application file for complete search history.

(56) References Cited

U.S. PATENT DOCUMENTS

| | | | | |
|---|---|---|---|---|
| 8,063,846 B2 * | 11/2011 | Imaoka | ............... | H01Q 1/2283 |
| | | | | 343/851 |
| 11,362,548 B1 * | 6/2022 | Ren | ........................ | H04B 5/24 |
| 2015/0005573 A1 * | 1/2015 | Lehmann | .............. | A61N 1/025 |
| | | | | 607/57 |
| 2016/0049723 A1 * | 2/2016 | Baks | ....................... | H01Q 1/22 |
| | | | | 343/848 |
| 2022/0181781 A1 * | 6/2022 | Arai | ..................... | H01Q 1/2283 |
| 2024/0178795 A1 * | 5/2024 | Abouzied | ............ | H03D 7/1491 |
| 2024/0409674 A1 * | 12/2024 | Yamate | ................... | C08J 5/246 |

OTHER PUBLICATIONS

Wiliot Solutions, "Wiliot Platform: IoT Pixels, Light Up Every Single Thing," found at https://www.wiliot.com/product/iot-pixels accessed on Aug. 19, 2025, 6 pages.

* cited by examiner

*Primary Examiner* — Hai V Tran
(74) *Attorney, Agent, or Firm* — Perkins Coie LLP; Colin M. Fowler

(57) ABSTRACT

An encapsulated radio frequency (RF) wireless power circuit and method to produce said encapsulated RF wireless power circuits, including transmitter and receiver circuits. In an example, the circuits are used in industrial sensor applications. The encapsulation discussed herein provides benefits including that in some embodiments, it is low cost, low profile, and waterproof, amongst other benefits. The method is used to produce radio frequency (RF) wireless power transfer systems, antennas, and integrated circuits, among other devices, and is achieved via different approaches (e.g., single or multi stage over-molding or vacuum sealing), and using various types of encapsulation materials (e.g., resin or thin-film packaging) as will be discussed herein.

20 Claims, 20 Drawing Sheets

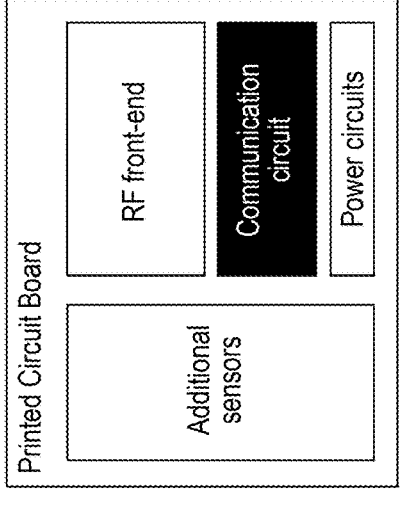
*FIG. 4A*
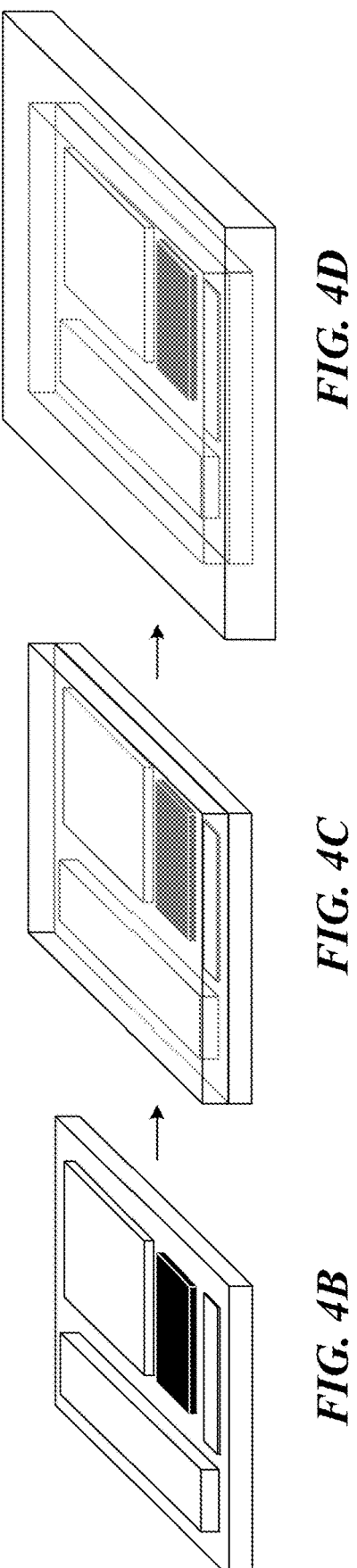
*FIG. 4D*
*FIG. 4C*
*FIG. 4B*

700a

A heat minimization technique, such as a heat sink, is introduced to the PCB

702a

PCB is placed in a mold that is the shape and size of the intended encapsulation 704a Resin is introduced to the mold and PCB board in the intended encapsulation region 700b The finalized PCB board is introduced to the packaging machine 702b PCB board or components are encapsulated in a thin film pouch and the pouch is sealed 808 substrate 810 core 806 resonator element 802 support region 804 antenna feed 800a mechanical base 30 (mm)

15

0

800b antenna

900a

902a

900d Device

902d Resin

910d PCB

908d

906d External connection points

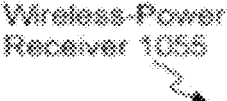

Wireless-Power
Receiver 1055

Signature-
Signal
Generating
Circuit
1310

Memory
1356

Operating Logic 1366

Communication Module 1368

Sensor Module 1370

Power-Receiving Module 1372

Database 1374

Sensor information 1376

Device settings 1378

Communication Protocol
Information 1380

Secure Element Module 1382

Signature-Signal Generating Module
1383

Processor(s)
1352

Comm.
Component(s)
1354

1358

Antenna(s)
1360

Sensor(s)
1362

Power
Harvesting
Circuitry
1359

Energy
Storage
Device
1361

Figure 13

REPLACING TRADITIONAL ENCLOSURE WITH ENCAPSULATED CIRCUITS FOR WIRELESS POWER AND DATA SYSTEMS

CROSS-REFERENCE TO RELATED APPLICATIONS

This application claims priority to U.S. Provisional Patent Application No. 63/827,687, filed Jun. 20, 2025, the disclosure of which is incorporated herein by reference its entirety.

BACKGROUND

The present disclosure relates generally to systems for harvesting radio-frequency (RF) wireless power and, in particular, to systems for harvesting RF wireless power using small-from factor devices with integrated and module harvesting receivers (e.g., the small form-factor devices can be digital price tags or small digital devices used to identify product information in warehousing settings) and wireless-power transmitters.

In current electronic systems, plastic and/or metallic enclosures are being used to house the circuits and electronic components. These enclosures are normally expensive and heavy. Moreover, to give desired mechanical stability and enterprise rating to the device, complex enclosures are required. Moving away from the forementioned old and complex methods, by encapsulating devices, we can achieve our desired requirements in a more effective way.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure. As one of skill will appreciate upon reading this disclosure in conjunction with the figures, the description may admit or contemplate other features.

FIG. 4 illustrates a process of applying film pouch encapsulation on a wireless system printed circuit board (PCB).

FIG. 9A shows a device encapsulated in a thin film pouch. FIG. 9B shows a device encapsulated in resin. FIG. 9C shows a device encapsulated in resin with wires extending out of the encapsulation for connection to external devices. FIG. 9D shows a device encapsulated in resin in a rectangular shape with wires extending out of the encapsulation for connection to external devices.

FIG. 13 is a block diagram illustrating a representative wireless-power receiver, in accordance with some embodiments. In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Figure 1:
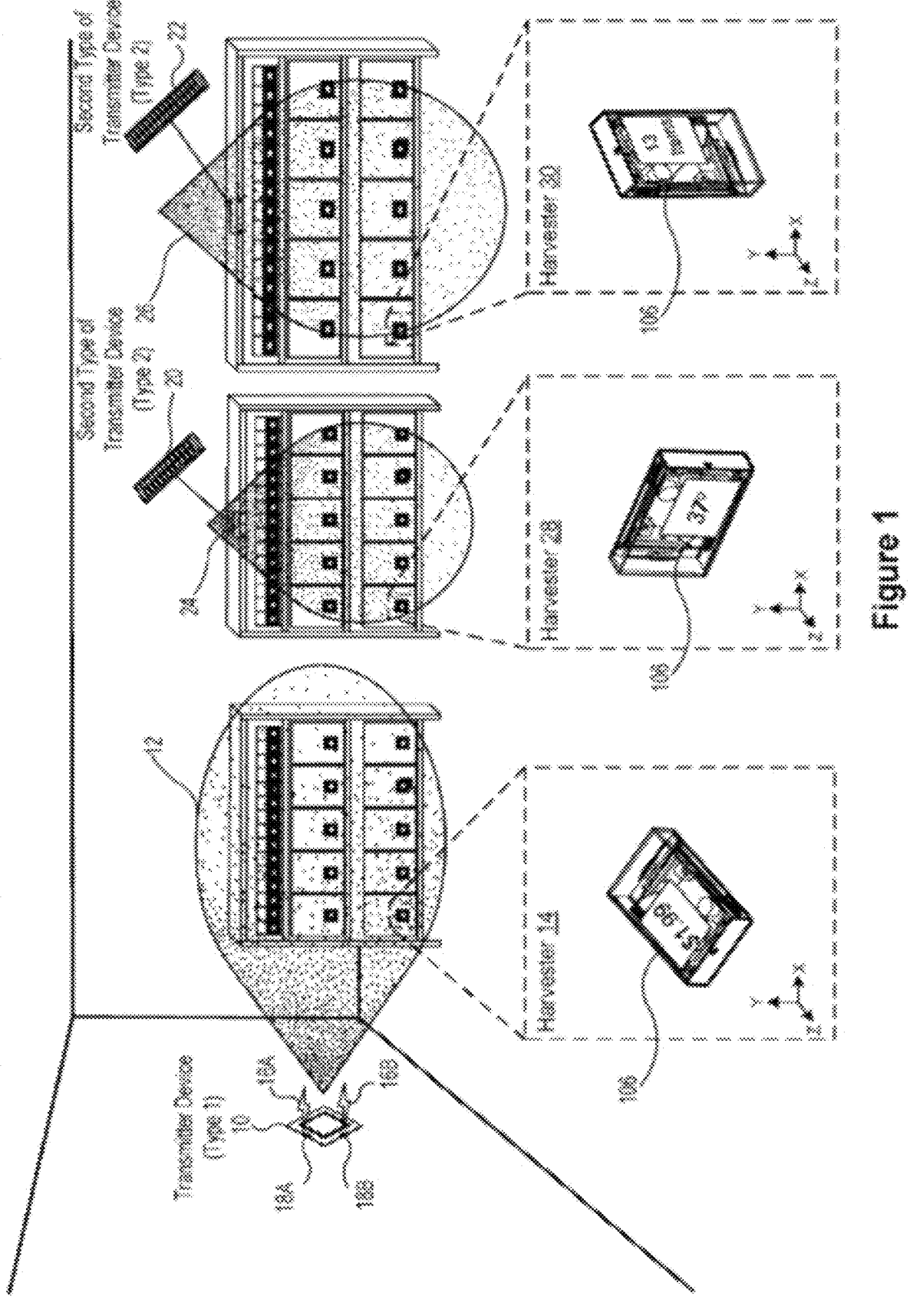
FIG. 1 illustrates an example environment (e.g., a warehouse) that includes multiple of the wireless-power-transmitting devices described here and multiple wireless-power receivers that have different orientations but still harvest sufficient power, in accordance with some embodiments.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

There are various types of wireless systems; some of these systems work with wireless data and/or power to achieve a certain set of functionalities. Internet of Things (IoT) devices are being widely used to create a network of sensors and collect and transmit meaningful data in real-time. To make a fully functional setting, a series of hardware pieces are required to make this architecture work in an efficient way. A goal of the present disclosure is to operate harvesting battery-free sensors, therefore, as the main part of the ecosystem, a given platform includes four main hardware pieces: the sensors/tags, the energizer, the Bluetooth Low-energy (i.e., BLE) listening unit, and a gateway that connects to send the data back to the cloud through long-range Bluetooth, Wi-Fi, or cellular links.

Encapsulating circuits are employed to create a low-cost low-weight enclosure for all these hardware pieces. Typical radio frequency (RF) wireless power circuits contain bulky, costly housing, including injection molded plastic or metal housing. The application of said housing requires not only expensive materials, but the RF circuits must be oriented in a specific fashion to effectively apply the housing. The encapsulated circuits discussed herein are produced and encapsulated without any intervening housing, such as the injection molded plastic or metallic housing discussed above, providing significant cost, material, bulk, and weight savings. Existing models are structured with a sticker placed on top of a circuit on a PCB. Said existing models don't provide full coverage of the circuit and the resulting device is not waterproof or resistant to the ingress of liquid. In contrast, as described below, the entire PCB is encapsulated to provide many benefits to the consumer, including water-proofing or sealing the PCB to liquid. As discussed herein, reference made to a "PCB" does not restrict the PCB to any specific material composition. In some embodiments, the PCB is composed of any suitably electrically insulated material such as fiberglass or plastic. A vacuum sealed pouch, similar to a candy wrapper is cheaper than an injection molded or 3D printed housing. Encapsulation using resin provides many unique benefits described herein.

The encapsulating can be done using thin film pouches or by simply over-molding the circuits with any molding solution. In some embodiments, the circuits are partially encapsulated. In some embodiments, the circuits are fully encapsulated. In some embodiments, the encapsulated devices contain wires extending out of the encapsulation to physically connect to other various circuits or devices. Encapsulation offers a few key advantages compared to a traditional housing made by machining and/or injection molding including that the herein described encapsulation is: low weight, low cost, low-profile and easy to install, water-proof (e.g., IP-67 or IP-69 rated), impact-resistant, customi-zable with special functionalities: different material can be used aiming to achieve various goals (e.g., heat resistance, UV-protection, etc.), and provides improved antenna per-formance. IP-67 rating is defined as complete protection against dust as well as protection against immersion in water up to one meter for up to 30 minutes. IP-69 rating entails complete protection against dust, as well as protection against powerful high-temperature jets of water. IP-67 devices are suitable for use in potentially wet or humid environments, and IP-69 rated devices are typically suitable for use in environments including industrial or outdoor settings.

These encapsulated circuits discussed herein provide a benefit in the form of improved antenna performance as described in commonly-owned U.S. Pat. No. 10,734,717 B2. By embedding the resonator element within a substrate having a high permittivity, the dimensions, including length or depth, of the antenna may be reduced. Reduction in antenna dimensions provides for a commercially viable solution in certain environments. It follows from this that loading the antenna through encapsulation allows these circuits to operate at lower resonant frequencies in a desired frequency band at the same physical size when compared to unencapsulated otherwise identical antennas and circuits. Encapsulation of the RF wireless power circuits also pro-vides mechanical stability to the antenna. Encapsulation may extend device performance and lifetime by preventing damage to the antennas caused by mechanical shock, such as from dropping or direct impact. Said encapsulation provides structural stability to the antenna in the above discussed RF wireless power circuits, which, in some embodiments, prevents the antenna from moving, shaking, or bending, and therefore preserves antenna performance.

The transmitter device (also referred to as a wireless-power transmitter device or wireless-power transmitter below) can be an electronic device that includes, or is otherwise associated with, various components and circuits responsible for, e.g., generating and transmitting electro-magnetic energy, forming transmission energy within a radiation profile at locations in a transmission field, moni-toring the conditions of the transmission field, and adjusting the radiation profile where needed. The radiation profile described herein refers to a distribution of energy field within the transmission range of a transmitter device or an individual antenna (also referred to as a "transmitter"). A receiver (also referred to as a wireless-power receiver) can be an electronic device that comprises at least one antenna, at least one rectifying circuit, and at least one power converter, which may utilize energy transmitted in the transmission field from a transmitter for powering or charg-ing the electronic device.

Due to the low profile and ease of installation of the encapsulated devices, as well as resistance to common factors that could damage conventional transmitters or receivers, including mechanical force, heat, and moisture, these encapsulated transmitter or receiver devices are ideal for many industrial use cases. The encapsulated transmitter or receiver circuits can be equipped with mounting aids, such as sticky tape strips or mounting holes for easy attach-ment to walls or other surfaces. Use cases include placement in manufacturing plants as sensors to gather and transmit data, in shipping containers or trucks, and many other applications where the various aspects of these encapsulated devices prove advantageous. The low profile of these devices can prevent collisions, if for example a person or piece of equipment is passing close to a wall-mounted device, which would otherwise occur with bulky, conven-tionally housed transmitter or receiver devices that would result in damage to the devices. This is not an exhaustive list of use cases, instead, there are many industrial applications.

The customizability of the molded encapsulation provides benefits when using the described encapsulated circuits. In various embodiments, different encapsulation materials are used, and the encapsulation applied in multiple steps, lead-ing to a significant number of options for encapsulation shape, size, and material. The customizability discussed herein provides the user of the encapsulated transmitter or receiver options to use the encapsulated devices in, for example, medical applications, high pressure or temperature industrial settings, or high humidity or wet environments.

The low cost of producing and encapsulating these devices provides advantages. Users of more expensive, conventionally housed devices will often attempt costly diagnostics and failure analysis, as well as repairs, on damaged transmitter or receiver devices. Not only does the encapsulation of the devices described herein provide better damage resistance than some conventional packaging, the low production cost and low cost of the encapsulation itself makes replacing damaged or broken devices very cost-effective. This benefit ultimately transfers to consumers of these devices.

FIG. 1 illustrates an example set-up of a combination of (i) a plurality of wireless-power harvester devices that are configured to receive radiated wireless power in multiple different orientations and include modular components that can be easily replaced and which are integrated with a small form-factor device (such as a digital price tag); (ii) a plurality of shelving-mounted wireless-power transmitters, and (iii) wireless-power transmitters capable of providing data and power signals in multiple orientations. As stated above, FIG. 1 illustrates two types of wireless-power transmitters configured to radiate RF signals to wireless-power harvester devices. Wireless-power transmitter 10 illustrates a first type of wireless-power transmitter that can be placed on walls, ceilings, or any other supporting structure within a building. The wireless-power transmitter is configured to emit RF wireless-power waves 12 to wireless-power harvester devices (e.g., wireless-power harvester device 14) and is also configured to emit data-communication signals 16A and 16B (unilaterally and bidirectionally) to one or more wireless-power harvester devices (e.g., wireless-power harvester device 14) using communication antennas 18A and 18B (e.g., BLE antennas). Wireless-power harvester device 14, while shown in a certain orientation, can be placed in any other orientation and still receive sufficient power (e.g., enough power to enable the harvester to provide usable power to power or charge an associated small form-factor electronic device, which can be a digital price tag in some embodiments), due in part to the circular polarization of the RF wireless-power waves. Additionally, the wireless-power harvester device 14 can also receive data-communication signals having any orientation, due to the dual linear polarization of the data-communication signals that allows those data-communication signals to be transmitted with both horizontal and vertical polarizations. Further details regarding the first type of wireless-power transmitter are discussed below in reference to FIG. 8. Further details regarding the wireless-power harvester device are discussed in reference to FIGS. 1A-2.

Shelving-mounted wireless-power transmitters 20 and 22 are a second type of wireless-power transmitter. These shelving-mounted wireless-power transmitters can be manufactured or dynamically adjusted to have different numbers of conductive segments in their respective antennas to adjust emission profiles for RF wireless-power waves. FIG. 1 shows shelving-mounted wireless-power transmitter 20 having a first number of conductive segments, which results in emission of RF power waves 24 to wireless-power harvester devices (e.g., wireless-power harvester device 28). Shelving-mounted wireless-power transmitter 22 has a second number of conductive segments, which results in emission of RF power waves 26 to wireless-power harvester devices (e.g., wireless-power harvester device 30). Wireless-power harvester devices 28 and 30, while shown in a certain orientation, can be placed in any other orientation and still receive sufficient power. Additionally, the wireless-power harvester devices 28 and 30 can also receive data-communication signals in any orientation. In some embodiments, it is also possible for the wireless-power harvester devices to harvest additional RF power waves from other nearby wireless-power transmitters (e.g., wireless-power transmitter 10). Further detail of the second type of wireless-power transmitter is discussed in reference to FIG. 3-7. Further detail regarding the wireless-power harvester device is discussed in reference to FIGS. 1A-4.

Figure 1A:
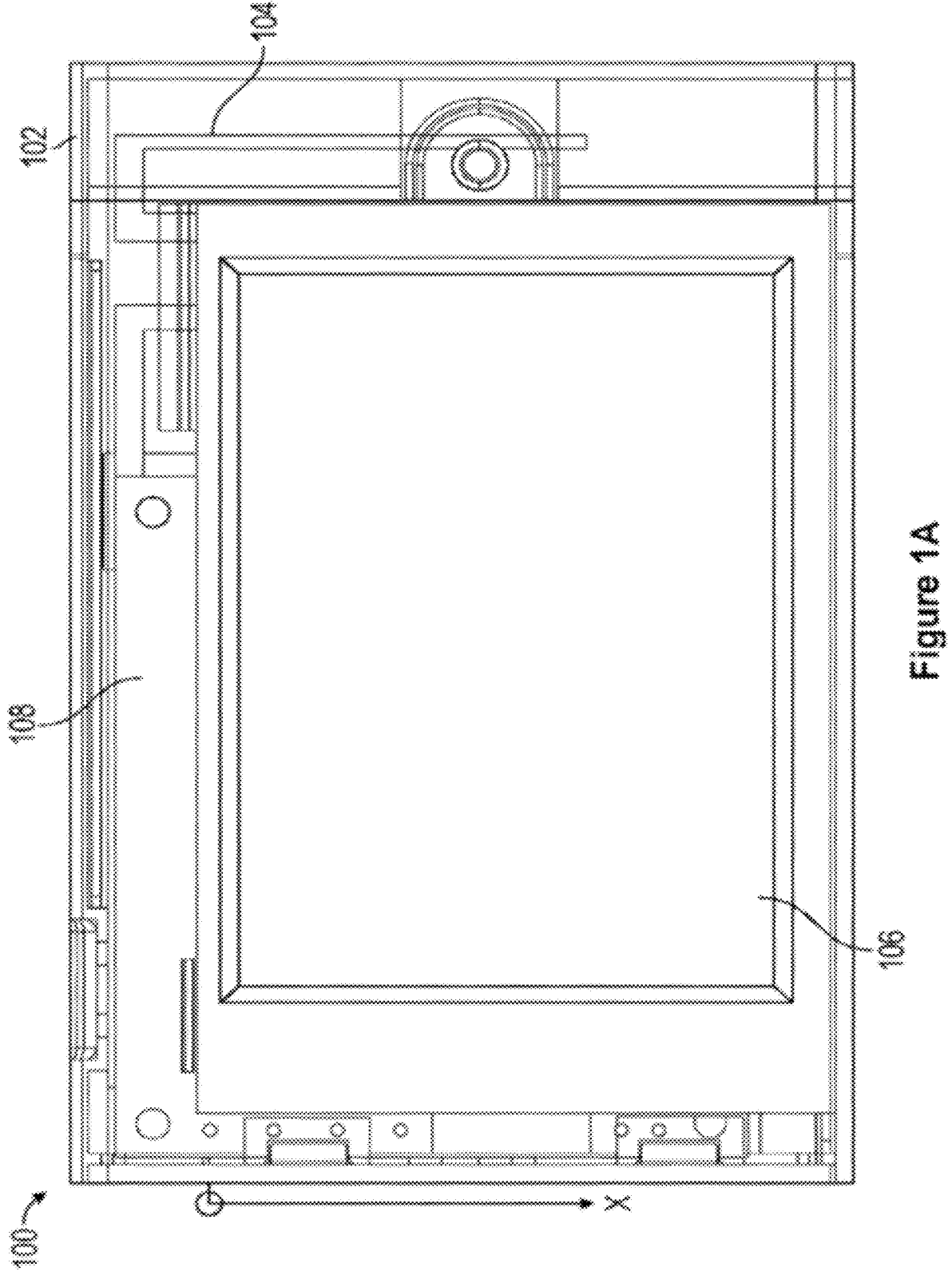
FIGS. 1A and 1B illustrate different views of a wireless-power harvester integrated in an electronic device, in accordance with some embodiments.
Figure 1B:
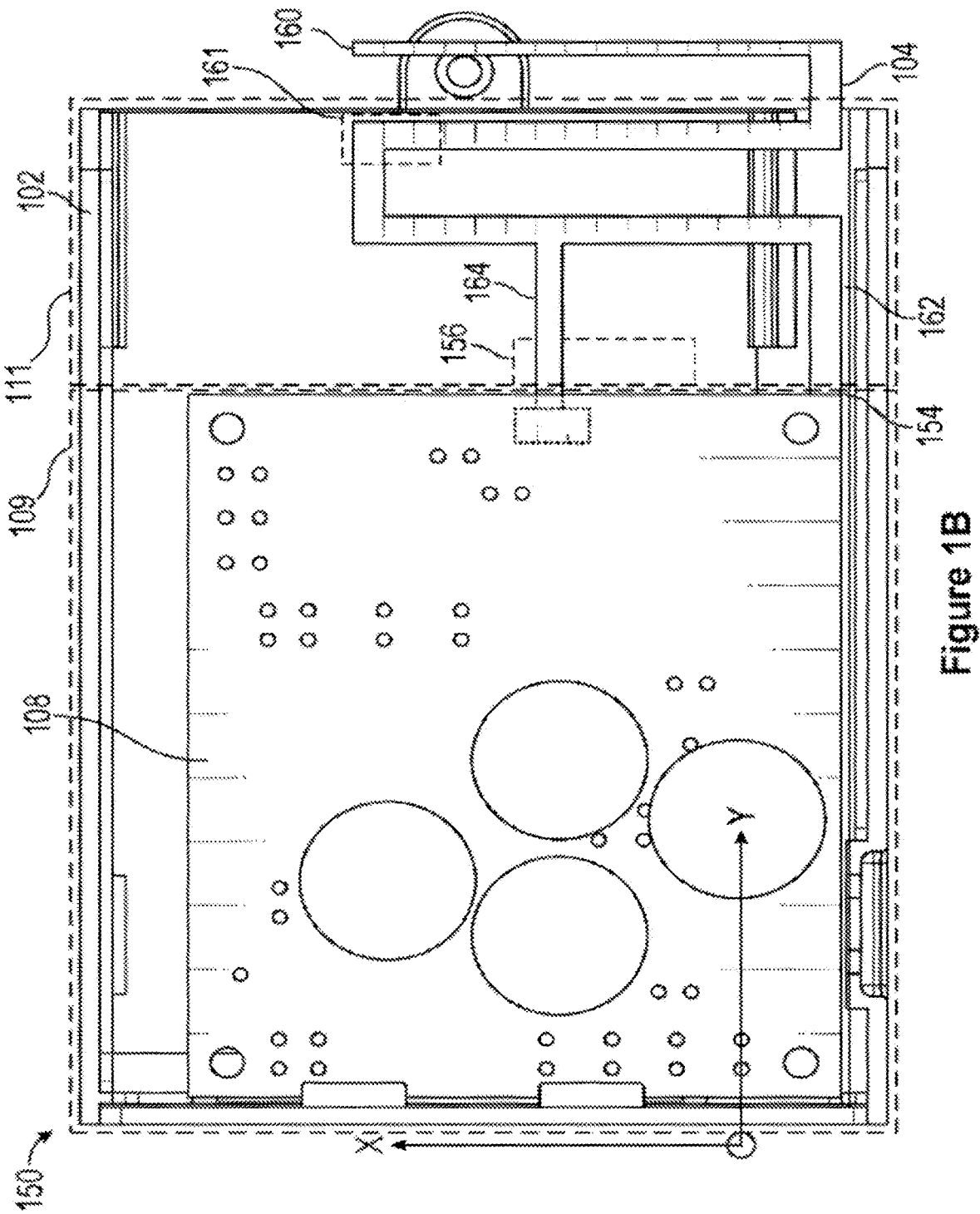
Figure 10:
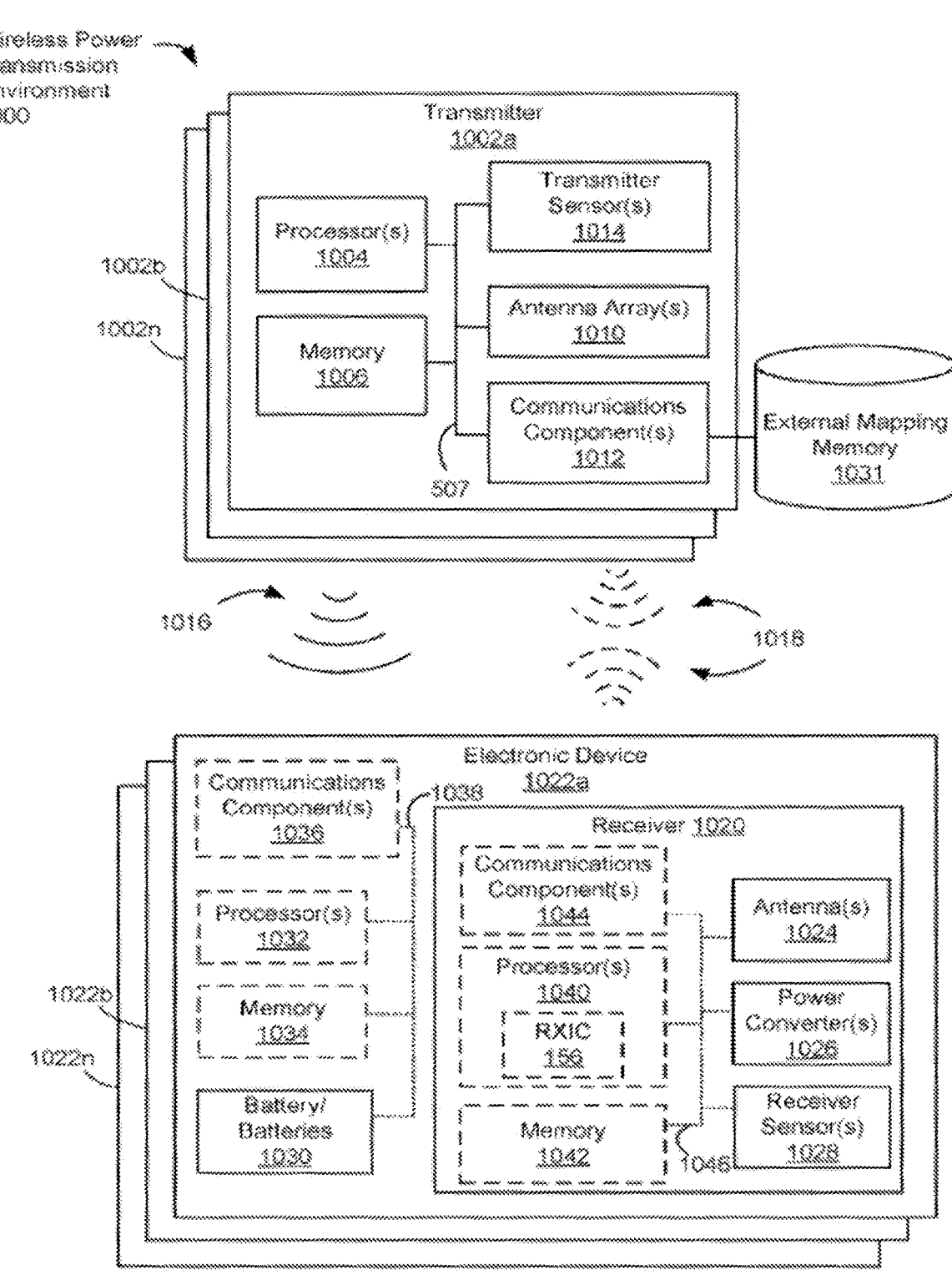
FIG. 10 is a block diagram of components of a wireless power transmission environment, in accordance with some embodiments.

FIGS. 1A and 1B illustrate different views of a wireless-power receiver (also referred to as a RF harvesting receiver) integrated in a small form-factor electronic device, in accordance with some embodiments. FIG. 1A shows a front view 100 of an electronic device 102 including a wireless-power receiver (e.g., wireless-power receiver 1020; FIG. 10). In some embodiments, the wireless-power receiver is integrated in the electronic device 102. The wireless-power receiver includes a harvester antenna 104 (e.g., a stamped metal harvester antenna, and/or an antennas 1024 described in reference to FIG. 10 below) coupled to a printed circuit board (PCB 108) of the electronic device 102. The electronic device 102 includes a display 106 powered by a power supply (e.g., a battery 1030; FIG. 10) of the electronic device 102. For example, FIG. 1 illustrates display 106 of each respective electronic device showing different information (e.g., temperature values for a shelf, quantity values of items for a shelf, and prices of items on a shelf, etc.). The wireless-power receiver is configured to receive wireless power transmitted by a wireless-power transmitter (e.g., transmitter 1002 of FIG. 10) such that electromagnetic energy is wirelessly transferred from the wireless-power transmitter to the wireless-power receiver, as described below. FIG. 1B shows a bottom view 150 of an electronic device 102 including a wireless-power receiver (e.g., wireless-power receiver 1020; FIG. 10). The bottom view 150 of the electronic device 102 shows the harvester antenna 104 coupled to the PCB 108 of the electronic device 102 and a receiver integrated circuit 156.

In some embodiments, the harvester antenna 104 is a stamped metal antenna that has a meandering shape. The meandering shape includes a predetermined number of turns or curves. In some embodiments, the predetermined number of turns is at least two. The harvester antenna 104 is quasi omnidirectional and configured to receive wireless power with any polarization. In some embodiments, a position of the harvester antenna 104 within the electronic device 102 is based, in part, on a size and/or a shape of a housing enclosing the wireless-power receiver (e.g., housing of electronic device 102).

In some embodiments, a first end 160 of the harvester antenna 104 (e.g., the meandering shaped antenna) is a free end configured to receive one or more radio frequency (RF) power waves. In some embodiments, the harvester antenna 104 is configured to receive the RF power waves at a frequency of 918 MHz. In some embodiments, the receiving antenna 104 has a gain of at least 2 dB (shown and described below in reference to FIG. 4). In some embodiments, the harvester antenna 104 is configured to harvest RF energy transmitted in the environment from background sources other than a dedicated transmitter.

In some embodiments, an intermediate portion 164 of the receiving antenna 104 is coupled to a receiver integrated circuit 156 (e.g., receiver integrated circuit 156). As discussed below, the receiver integrated circuit 156 is configured to convert one or more RF power waves received by the first end of the meandering shape into usable energy for charging a battery of the electronic device 102 or for powering the electronic device 102. In some embodiments, the receiver integrated circuit 156 is an integral part of the PCB 108. Alternatively, in some embodiments, the receiver integrated circuit 156 is on a substrate distinct from the PCB 108.

In some embodiments, a second end 162 of the harvester antenna 104 is coupled to the PCB 108 of the electronic device 102—more specifically, an edge 154 of the PCB 108. In this way, the PCB 108 is configured to operate as a reference ground plane of the harvester antenna 104. The second end 162 of the harvester antenna 104 can be coupled to any edge portion of the PCB 108. In some embodiments, the edge portion of the PCB 108 at which the harvester antenna 104 is coupled is based, in part, on a size and/or a shape of a housing enclosing the wireless-power receiver (e.g., housing of electronic device 102) such that the first end 160 of the harvester antenna 104 is able to receive wireless power.

In some embodiments, the electronic device 102 is a digital price tag including a display 106. The electronic device 102 can be any small form factor device. For example, the electronic device 102 can be a digital price tag, a digital timer, a digital thermometer, a digital scale, an aspect of a smart shopping cart, a tablet, a controller, or other components used to manage inventory and pricing in supermarket or warehouse contexts, etc. In some embodiments, the electronic device 102 includes a communications component (e.g., communications component 1036 and/or 1044; FIG. 10) configured to communicatively couple to one or more electronic devices and/or wireless-power transmitters. For example, the electronic device 102 can be located within a supermarket and communicatively couple with a plurality of wireless-power transmitters 302 positioned within the supermarket and/or a computer network within the supermarket. In some embodiments, the electronic device 102 transmits and/or receives data to the one or more communicatively coupled electronic devices and/or wireless-power transmitters 302. The data can include charging information such as battery life, amount of power received, charge requests, etc. In some embodiments, the data can include electronic device 102 specific data. For example, a digital price tag can transmit data regarding the number of objects on a shelf, object price, total stock of an object, discount or sales related to the object, etc. Similarly, the digital price tag can receive data updating a price or other information of an object.

In some embodiments, the electronic device 102 can be located within a supermarket and communicatively couple with a plurality of wireless-power transmitters 302 positioned within a warehouse for actively updating inventory levels. A plurality of electronic devices 102 and a plurality of wireless-power transmitters 302 may be positioned around the warehouse. Additionally, the plurality of electronic devices 102 and a plurality of wireless-power transmitters 302 in the warehouse can be configured to communicate with a network to update the displays of the electronic devices to reflect inventory levels. In some embodiments, the electronic devices 102 are in communication with the network. In some embodiments, the plurality of electronic devices 102 communicate with the plurality of wireless-power transmitters 302, and the plurality of wireless-power transmitters 302 communicate with the network.

The harvester antenna 104 is interchangeable. More specifically, the harvester antenna 104 is configured such that it can be positioned and/or repositioned along any edge of the PCB 108 of an electronic device 102. The harvester antenna 104 can be designed to accommodate different configurations of the electronic device 102. For example, the receiving antenna 104 can be coupled to different electronic devices including different PCB layouts, distinct components, and/or distinct housings. The harvester antenna 104 can be retrofitted into existing electronic devices 102 and or incorporated into an electronic device 102 during manufacturing. The harvester antenna 104 is inexpensive and easy to manufacture, which increases the number of electronic devices 102 in which the harvester antenna 104 can be integrated. This increases the availability of wireless power to an electronic device 102.

Figure 2:
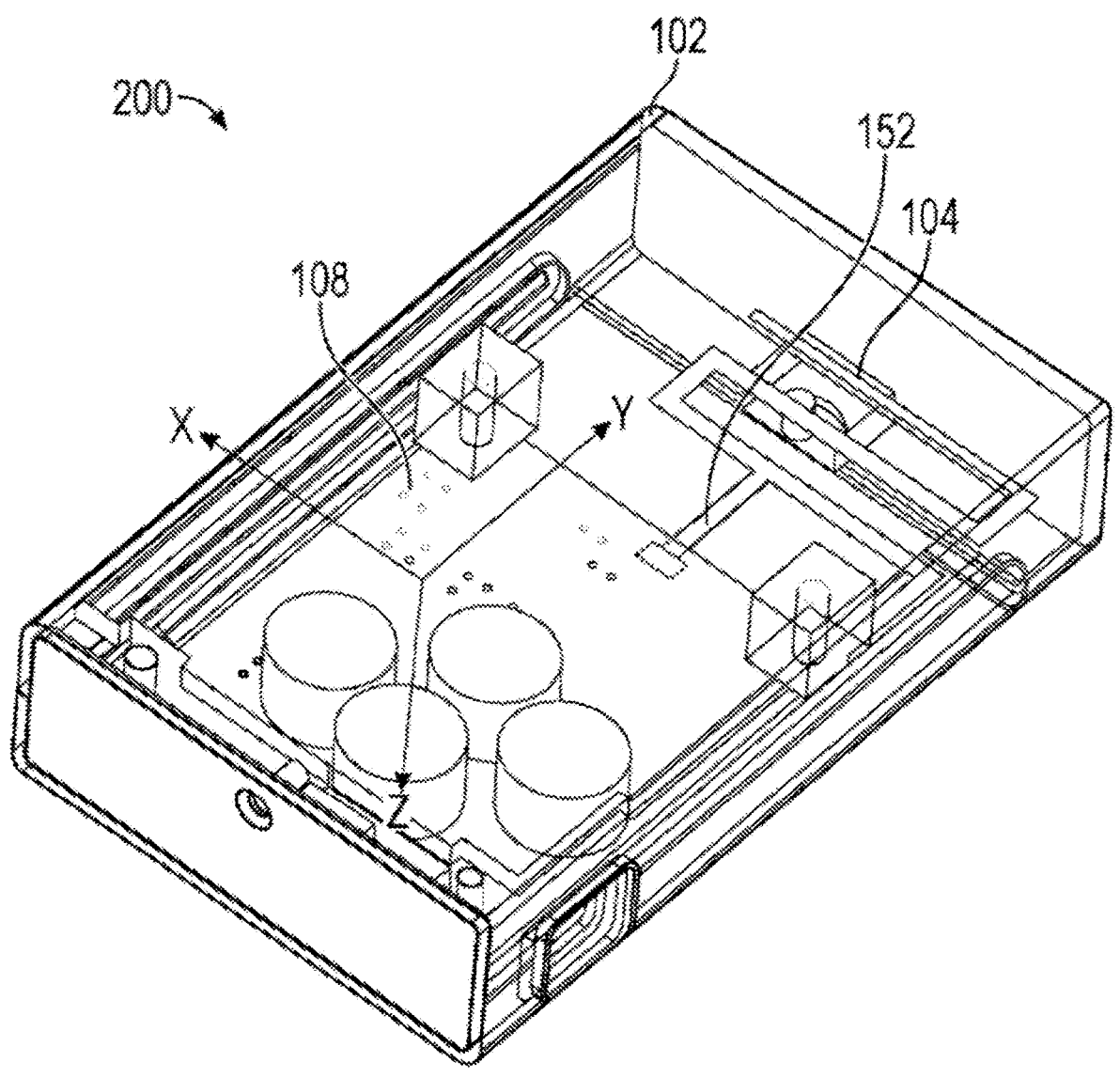
FIG. 2 illustrates an integrated wireless-power harvester enclosed by a housing of a small form-factor electronic device, in accordance with some embodiments.

FIG. 2 illustrates an integrated wireless-power receiver enclosed by an electronic device, in accordance with some embodiments.

Figure 3:
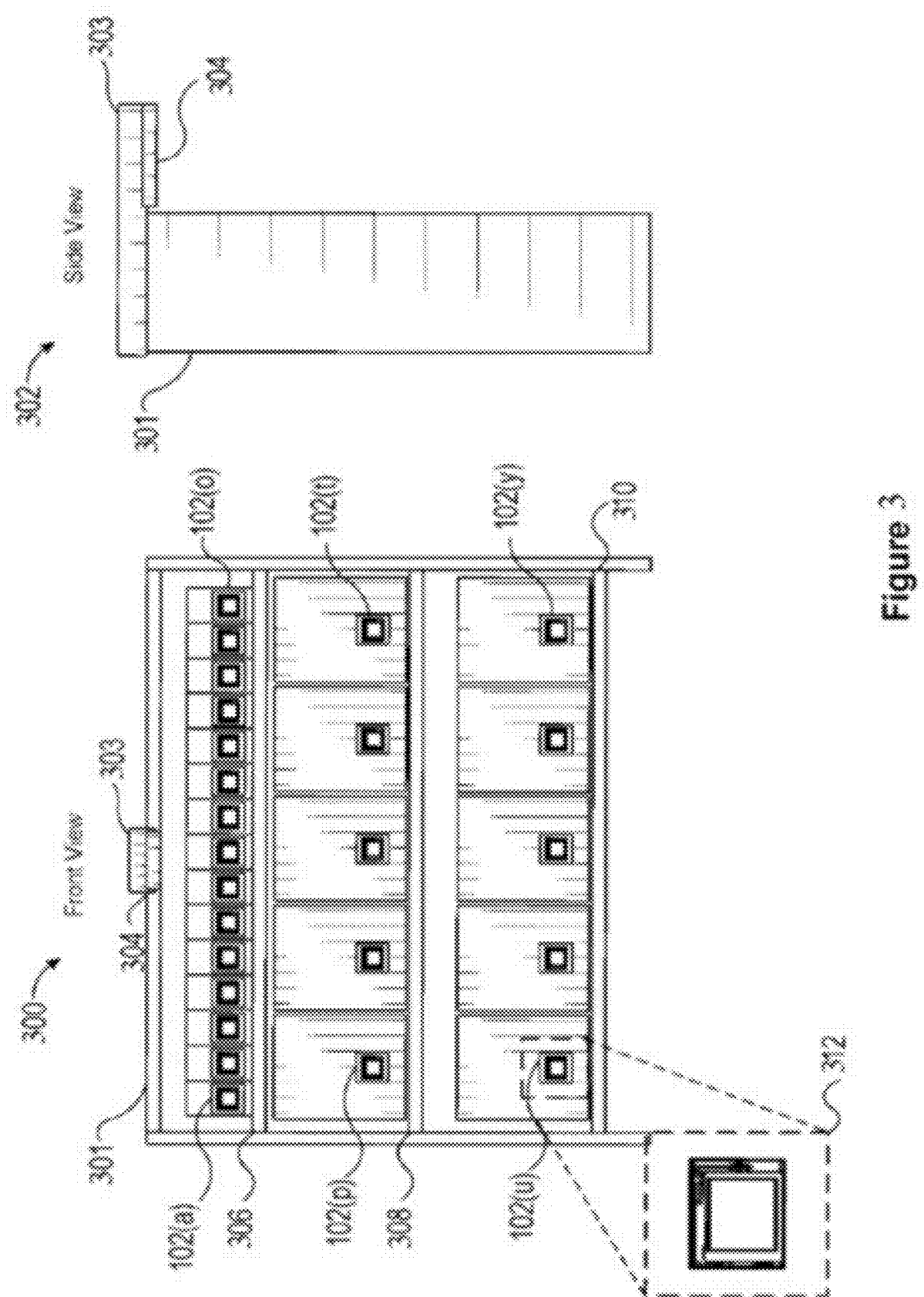
FIG. 3 illustrates a shelving-mounted wireless power transmitting system for powering and/or charging one or more wireless-power harvesters integrated into small form-factor electronic devices, in accordance with some embodiments.
Figures 5A, 5B, 5C, 5D:
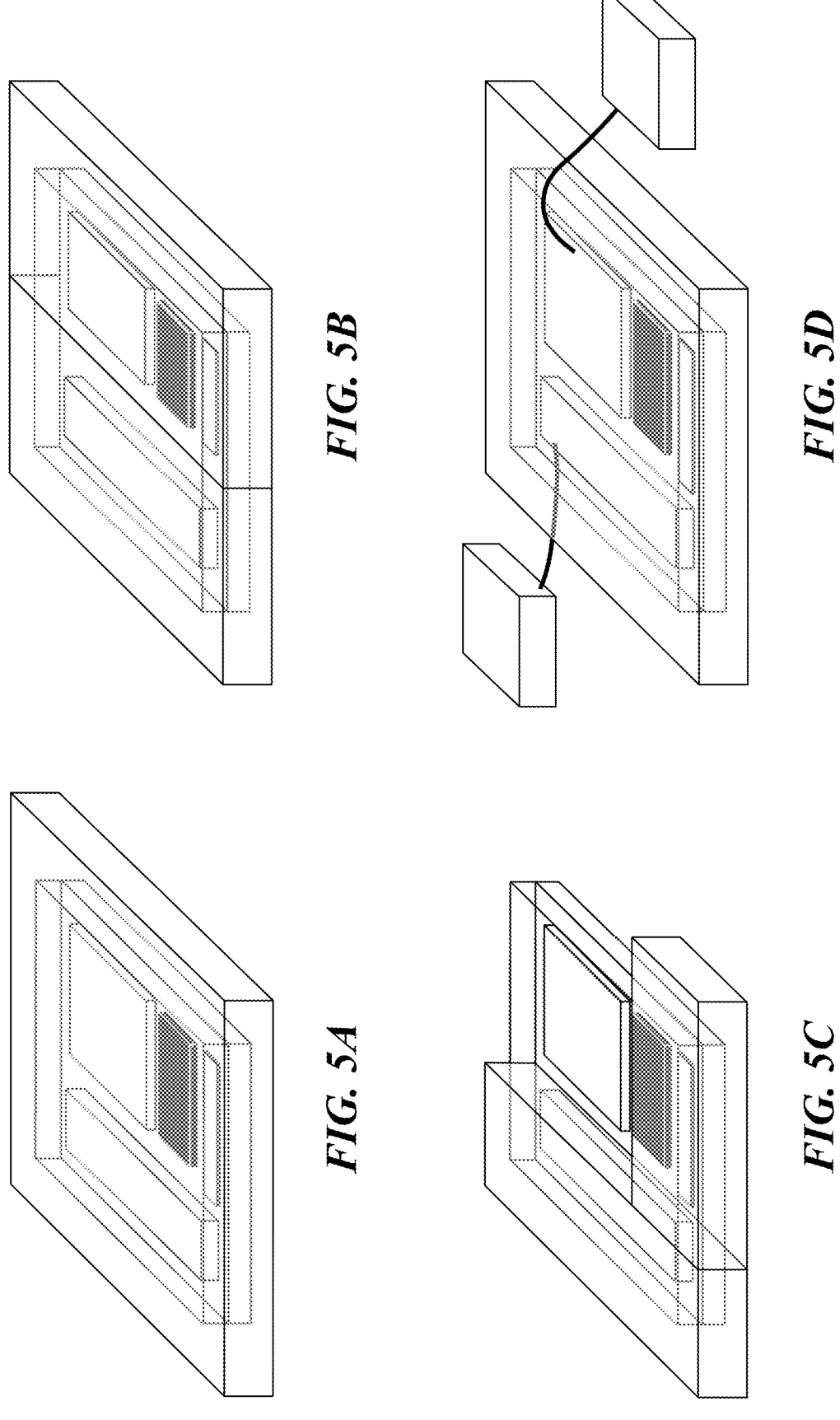
FIG. 5A-D illustrates a number of encapsulation embodiments where (a) shows the entire PCB being encapsulated. (b) the PCB is encapsulated using more than one material (this can be due to different requirements in heat-tolerance of components in different areas of the PCB). (c) the PCB is partially encapsulated. (d) the PCB is fully encapsulated while some wires are reaching outside for additional connections.

FIG. 3 illustrates a shelving-mounted wireless-power transmitting system for powering and/or charging one or more wireless-power receivers integrated into an electronic device (e.g., electronic device 102 in FIGS. 1A and 1B), in accordance with some embodiments. In particular, FIG. 3 shows a front view 300 of a shelving system 301 (e.g., shelving rack) and a side view 302 of a shelving system 301. Front view 300 of a shelving system 301 illustrates a shelving-mounted wireless-power transmitter system 304 placed at the top of the shelving system 301 (e.g., shelving-mounted wireless-power transmitter system 304 is placed above the one or more wireless-power receivers) that is configured to project radio frequency (RF) power waves to the one or more wireless-power receivers placed on the different shelves of the shelving system. In some embodiments, the transmitter system is mounted to the shelving system (e.g., shelving unit) via a mounting structure (e.g., mounting structure 303). The front view 300 of the shelving system 301 also shows a plurality of electronic device(s) 102 placed on each shelf of the shelving system. The uppermost shelf 306 has a first plurality of electronic device(s) (e.g., 102(*a*) through 102(*o*)) placed on the uppermost shelf. In some embodiments, the first plurality of electronic device(s) are attached to items that are placed on the uppermost shelf. In some embodiments, the first plurality of electronic device (s) are placed directly (e.g., placed on an outward edge of the uppermost shelf) on the shelves at locations corresponding to items resting on the shelf. Front view 300 of the shelving system 301 also illustrates a middle shelf 308 that includes a second plurality of electronic device(s) 102 (e.g., 102(*p*) through 102(*t*)) placed on it, and a bottom shelf 310 that includes a third plurality of electronic device(s) 102 (e.g., 102(*u*) through 102(*v*)). Front view 300 of the shelving system 301 also shows an expanded electronic device 312, which corresponds to the electronic devices discussed in reference to FIG. 1A through FIG. 2. FIG. 3 also illustrates a side view 302 of a shelving system 301 that shows the placement of the shelving-mounted wireless-power transmitter system 304 relative to the shelving system 301.

In some embodiments, the encapsulated device 312 is mountable. In some embodiments, mounting is made possible by the addition of a double-sided sticky strip of material, in which one side of the sticky strip is configured to stick to the encapsulated device and the other side of the sticky strip is configured to stick to a surface, such as a wall. In some embodiments, the sticky strip is attached to one side of the encapsulated device after the encapsulation process is complete. The use of the encapsulated device coupled to a sticky mounting strip provides advantages in the simplicity of mounting, in the fact that the device can be quickly attached to many surface types. In some embodiments, the encapsulation includes holes so that the device is easily mounted on a wall or rack. In some embodiments, the encapsulated device with mounting holes is mounted using screws or nails. The thin profile of these encapsulated devices when mounted, compared to conventional plastic or metal housing, provides advantages in industrial environments. In some embodiments, the sticky strip or mounting holes allows the transmitter or receiver device to be attached to, for example, a wall of a factory or the inside of a shipping vehicle.

FIG. 4 illustrates a process of applying film pouch encapsulation on a wireless system printed circuit board. The general procedure of the proposed method is as follows. In step 1, a first round of the protecting cover/over-mold on the main components is placed on the printed circuit board (PCB). In step 2, the entire part is encapsulated inside a thin-film pouch or will be over-molded.

In some embodiments, the encapsulating process is done in a single phase covering the entire unit or is used for smaller individual parts of a system. In some embodiments, the encapsulating process is done in multiple steps. In some embodiments, critical components are encapsulated first, before the rest of the PCB is encapsulated. In some embodiments, the encapsulation is partial, only covering certain components on the board. In some embodiments, multiple types of resin or other material are used in the encapsulation process.

In some embodiments, the encapsulating process is altered to accommodate buttons or transparent windows.

In some embodiments, a unit is encapsulated by combining more than one solution, e.g., the manufacturer employs thin-film pouches covering small segments while over-molding the entire circuit. In some embodiments, multiple types of resin or other material are used in the encapsulation process. In some embodiments, the PCB is first partially encapsulated by resin and then completely over-molded using silicone or another medical-grade material for use in medical applications.

In some embodiments, a unit is partially encapsulated, e.g., a manufacturer employs a hardware piece encapsulated while the antenna piece is connected to the molded part through extended cables/wires.

In some embodiments, the over-molding is performed using resin. The resin may be heated before encapsulating the circuit, upon which it cools and hardens. In some applications, there exists concern about damage to the transmitter or receiver due to the high temperature resin. In some embodiments, heat damage is avoided by first encapsulating the critical circuits with resin before further encapsulation steps are undertaken, as to avoid applying the heated resin to the entire PCB in one step. In some embodiments, heat damage is avoided by exposing a portion of the PCB as a heat tap and including a heat sink coupled to the device to extract heat during the encapsulation process. In some embodiments, this heat sink is a copper plate screwed to the back of the PCB. In some embodiments, the small size of the transmitter and receiver circuits, and therefore the small amount of resin applied, limits heat damage. In some embodiments the thin film package is a thermoplastic elastomer, such as a thermoplastic polyamide elastomer (TPA). TPA is meant as a non-limiting example, and any other suitable material may be used as the thin film package to encapsulate the RF wireless power circuits.

FIG. 5A-D illustrate a number of encapsulation embodiments where (a) shows the entire PCB being encapsulated. (b) the PCB is encapsulated using more than one material (this can be due to different requirement in heat-tolerance of components in different areas of the PCB). (c) the PCB is partially encapsulated. (d) the PCB is fully encapsulated while some wires are reaching outside for additional connections.

Figure 6:
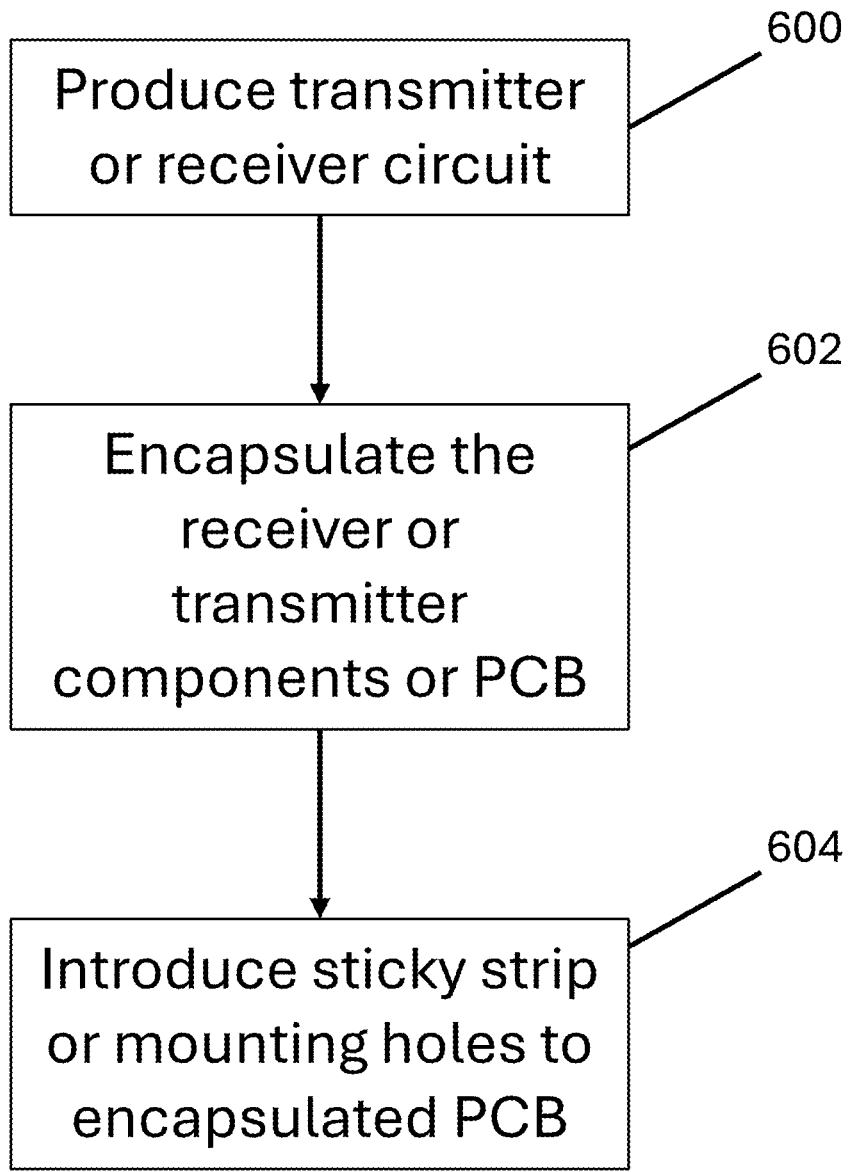
FIG. 6 is a block diagram that shows the general encapsulation process.

FIG. 6 shows a flow chart of the general process of creating encapsulated receiver or transmitter circuits. First, in 600 the device is created relative to customer specifications. In 602 the device undergoes the encapsulation process. In some embodiments, the encapsulation is completed using resin. In some embodiments, the encapsulation is a thin-film package. In some embodiments the thin film package is TPA. As shown in 604, the device then may have a mounting element attached. In some embodiments, the mounting element is a double-sided sticky strip. In some embodiments, the device has holes created in the encapsulation for mounting with, for example, nails or screws. In some embodiments, the mounting process allows the encapsulated device to be securely attached to a surface, such as a wall of an industrial building/factory, or to the inside of a shipping container or truck.

Figure 7A:
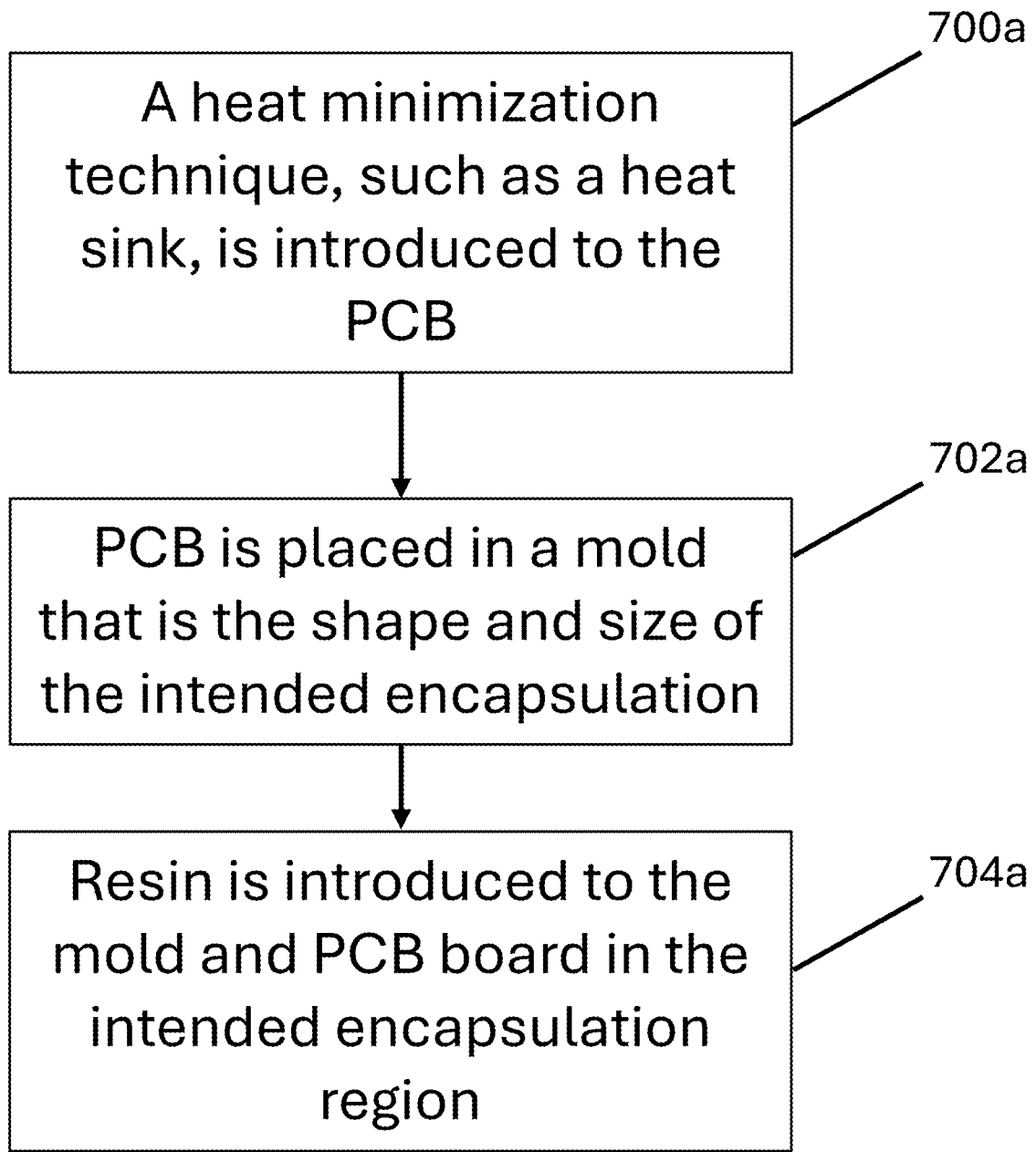
FIG. 7A is a block diagram that describes the encapsulation process in which the encapsulation material is resin.

FIG. 7A is a flow chart showing the resin encapsulation process for a receiver or transmitter PCB device. In 700*a*, heat protection is added to the device. In some embodiments, this is in the form of first applying resin to certain critical components. This partial encapsulation allows heat to escape from critical components as the resin is applied. In some embodiments, a heat sink is attached to one side of the PCB so heat can be extracted during resin application. In some embodiments, a window is created to allow heat to effectively escape to the attached heat sink. In 702*a*, the PCB is placed in a mold that is the shape or size of the intended encapsulation. In some embodiments, a mold is placed around individual components of the device for selective encapsulation. In some embodiments, the entire PCB is placed in a mold for complete encapsulation. In some embodiments, the mold is cylindrical in shape. In some embodiments, the mold is rectangular in shape. In some embodiments, the mold shape and size are adjustable parameters that may be determined by specific customer or industrial needs. In 704*a* the resin is introduced into the mold and the PCB is encapsulated. In some embodiments, the resin encapsulated device has multiple wires 906*c* (shown further in FIGS. 9C and 9D) protruding from the encapsulation for connection to external devices.

Figure 7B:
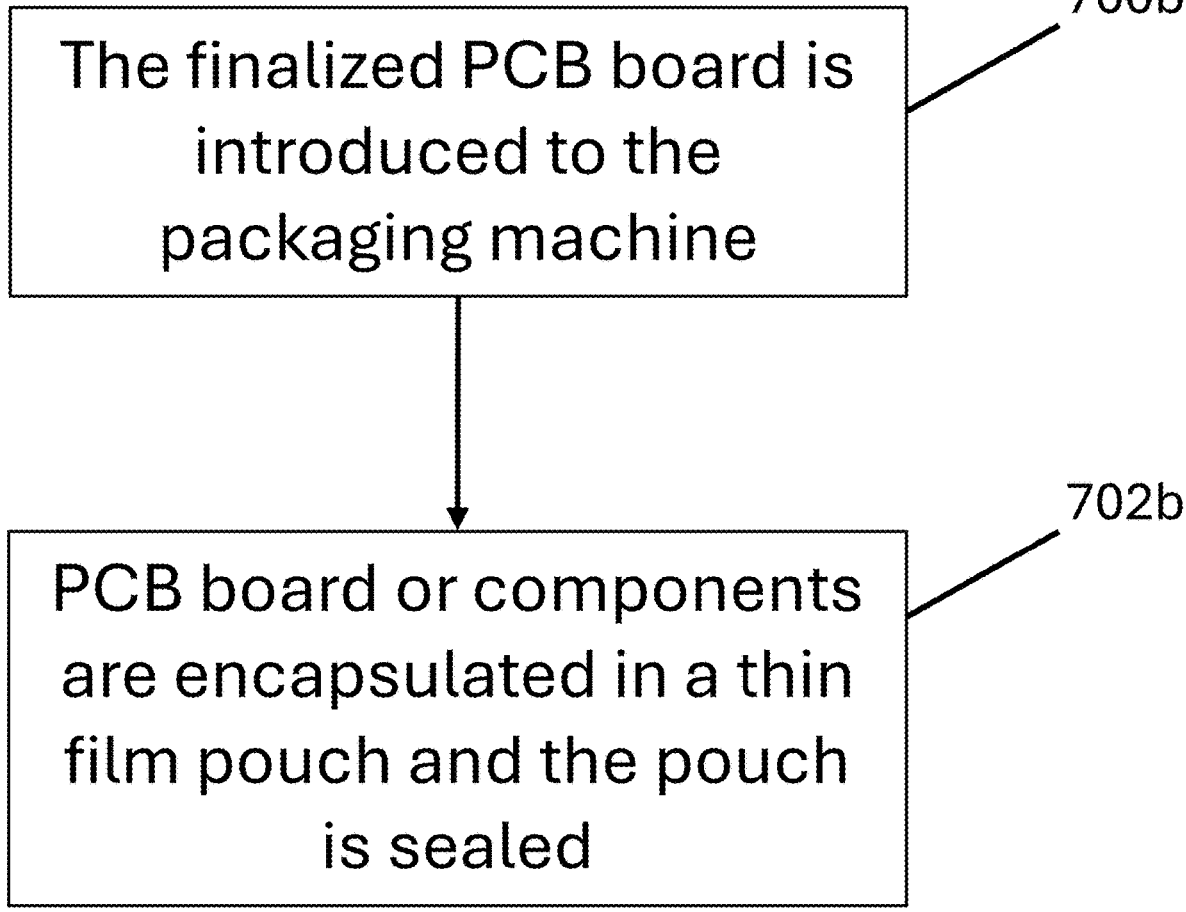
FIG. 7B shows the encapsulation process in which the encapsulation is a thin film package.

FIG. 7B shows the process by which the TPA package is applied to the PCB. In 700*b* the transmitter or receiver circuit is introduced to the packaging machine. In 702*b* the packaging machine encapsulates the device in a thin film pouch and the pouch is sealed. In some embodiments, the thin film package is made of TPA. In some embodiments, the TPA package encapsulated device has multiple wires protruding from the package for connection to external devices.

Figure 8:
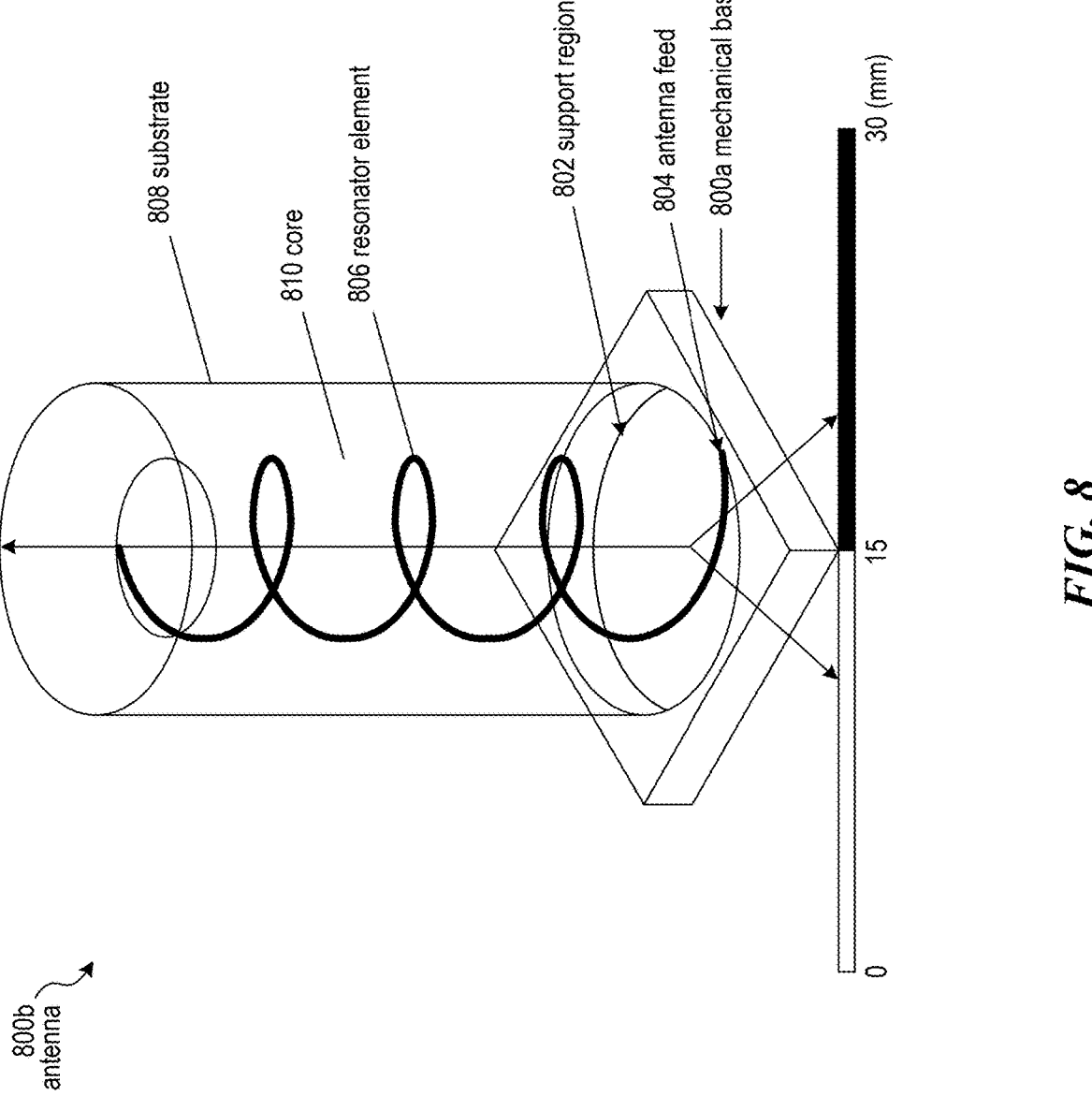
FIG. 8 illustrates an antenna encapsulated in a substrate.

FIG. 8 shows an illustration of the mechanical base 800*a* inclusive of a helical antenna 800*b* or resonator element 806 embedded within a substrate 808, and mounted to the base 800*a* as shown. The substrate may be a ceramic substrate, such as alumina, but could be any other substrate that has a relative permittivity within a specified range that supports reduced dimensions and certain performance of the antenna. In one embodiment, the relative permittivity (i.e., normalized to a vacuum permittivity) is between approximately 9 and approximately 10. Other relative permittivity ranges may be possible depending on the frequencies, gain, antenna pattern, or any other parameter. In general, encapsulation substrates with larger values of relative permittivity have a more pronounced impact on wave properties, such as speed of propagation and wavelength. Relative permittivity influences antenna performance by altering the speed and wavelength of wave propagation. Specifically, higher relative permittivity mediums slow wave propagation while at the same time decreasing the wavelength of the propagating waves, which results in an antenna system that operates at a shorter wavelength for a given frequency. As antenna length is typically directly correlated to the signal wavelength the antenna receives or transmits, a circuit designer can incorporate a substrate with a high relative permittivity to employ a smaller antenna geometry that maintains performance at a specific frequency.

The ability to tune an antenna to operate at a specific frequency or range of frequencies is important in antenna-based RF signal transmission and receipt. Generally, the smaller an antenna, the lower the wavelength and higher the resonant frequency it most efficiently operates at. Physically small antennas offer the benefit of allowing for the creation of small form-factor devices, which are advantageous in many industrial and consumer applications as a space-saving mechanism. Some important antenna performance parameters that are typically related to antenna size include operating resonant frequency, gain, and directivity, amongst others. However, gain and directivity may also be influenced by other factors including antenna geometry, material selection, and circuit design. Power transmission efficiency between transmitter and receiver devices is directly linked to frequency matching, as well as quantities such as gain and directivity. In some mobile power transfer transmitter and receiver architectures, high gain and directivity are not necessarily preferred. In some applications, lower gain and directivity mean that antenna performance is consistent regardless of antenna orientation.

Typically, the smaller an antenna, the higher the operating resonant frequencies available for transmission or receipt by said antenna. Directly related to the resonant frequency is the RF range of the antenna, which has an inverse relationship with frequency; the higher the frequency of the RF radiation the antenna transmits, the shorter the range of the antenna. As shrinking the size of an antenna generally increases the frequency of the RF radiation an antenna transmits or receives and would therefore reduce the antenna's operating distance, it follows that it would be ideal to determine a way to physically shrink the antenna while maintaining the resonant frequency and operating distance of a larger antenna. In some embodiments, the solution is to encapsulate the antenna in resin, which supports shrinking the size of the antenna while maintaining the desired resonant frequency of operation, operating range, gain, directivity, and power transfer efficiency, among other properties. The relative permittivity of the encapsulation medium is a parameter that can be adjusted along with antenna size to obtain desired antenna operating parameters.

In some embodiments, a specific antenna and device orientation is desired, so directivity and gain levels are altered to ensure that an energy pocket at a receiver is sufficiently small in dimensions with sufficiently high energy such that remote charging of a wireless device may occur. As described herein, physically encapsulating a device containing an antenna allows for the use of smaller antennas while maintaining frequency requirements and higher levels of gain and directivity than identically sized, unencapsulated antennas.

Similarly, encapsulating the antenna provides the benefit of improved mechanical stability. In some embodiments, resin encapsulation of the antenna protects the antenna from mechanical shock, such as from dropping the RF wireless power circuit or from direct impact. The enhanced protection provided by resin encapsulation as compared with conventional, injection molded housing allows the resin-encapsulated circuits to operate with higher performance and at longer lifetimes, providing a benefit to the user of the encapsulated circuits in terms of cost savings, higher reliability, and lower risk of damage to the critical circuit components, such as the antenna.

Figure 9A:
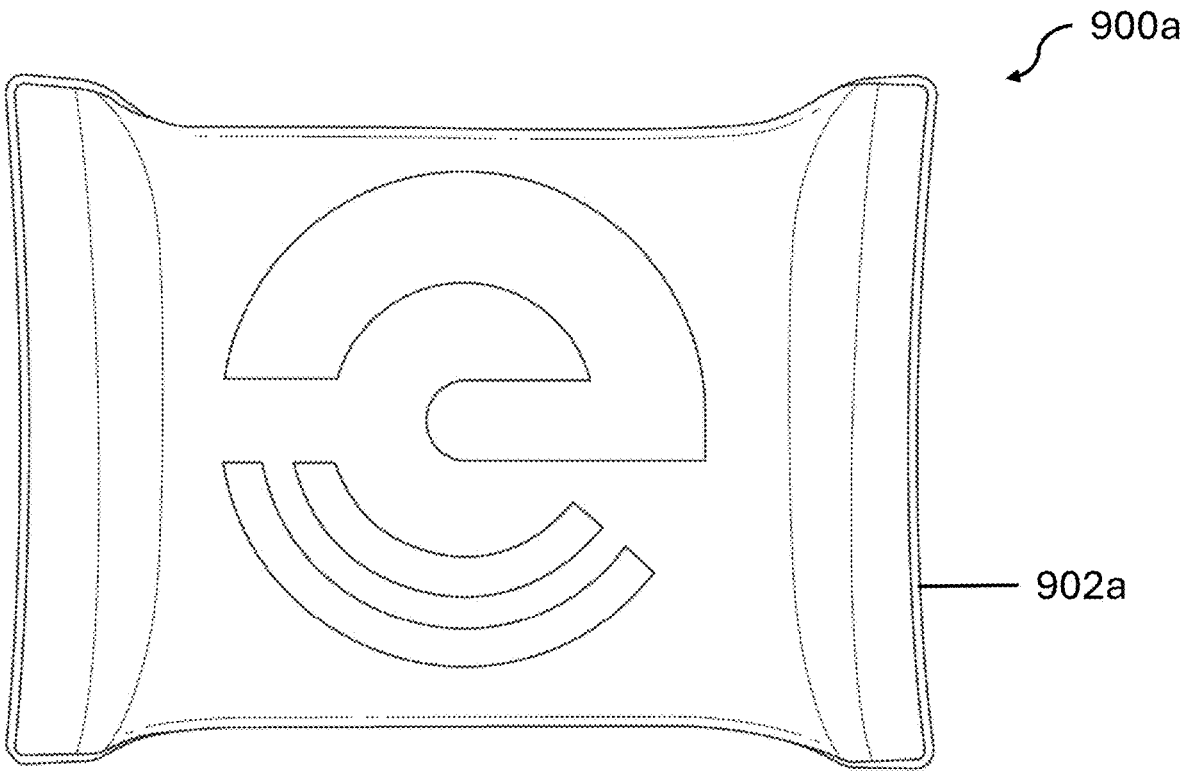
FIGS. 9A-D illustrates a number of embodiments of the encapsulated device.

FIGS. 9A-9D show multiple embodiments of the encapsulated device. In FIG. 9A, the encapsulated device 900a is shown, including a receiver or transmitter encapsulated in a thin film package or pouch 902a. In some embodiments, the thin film package 902a is vacuum sealed. In some embodiments the thin film package 902a is made of TPA. The sealed TPA package is low cost and provides the benefit of being waterproof and low profile for mounting. In some embodiments, the packaging process used to encapsulate the receiver or transmitter devices in a thin film package resembles the packaging process of a candy wrapping machine. The packaging process may be performed on a conveyer belt or assembly line that wraps each part after all of the various electrical components 908d are connected to the PCB. In some embodiments, the packaging occurs while the device is still in motion on the conveyer belt, without slowing down or stopping. In some embodiments, the device does not need to be oriented in any particular orientation by the packaging machine before the thin film package is installed on the device. In some embodiments, in contrast to high precision assembly, the thin film encapsulation process (FIG. 7B) described herein allows for high throughput and low-cost production while maintaining device integrity and performance.

Figure 9B:
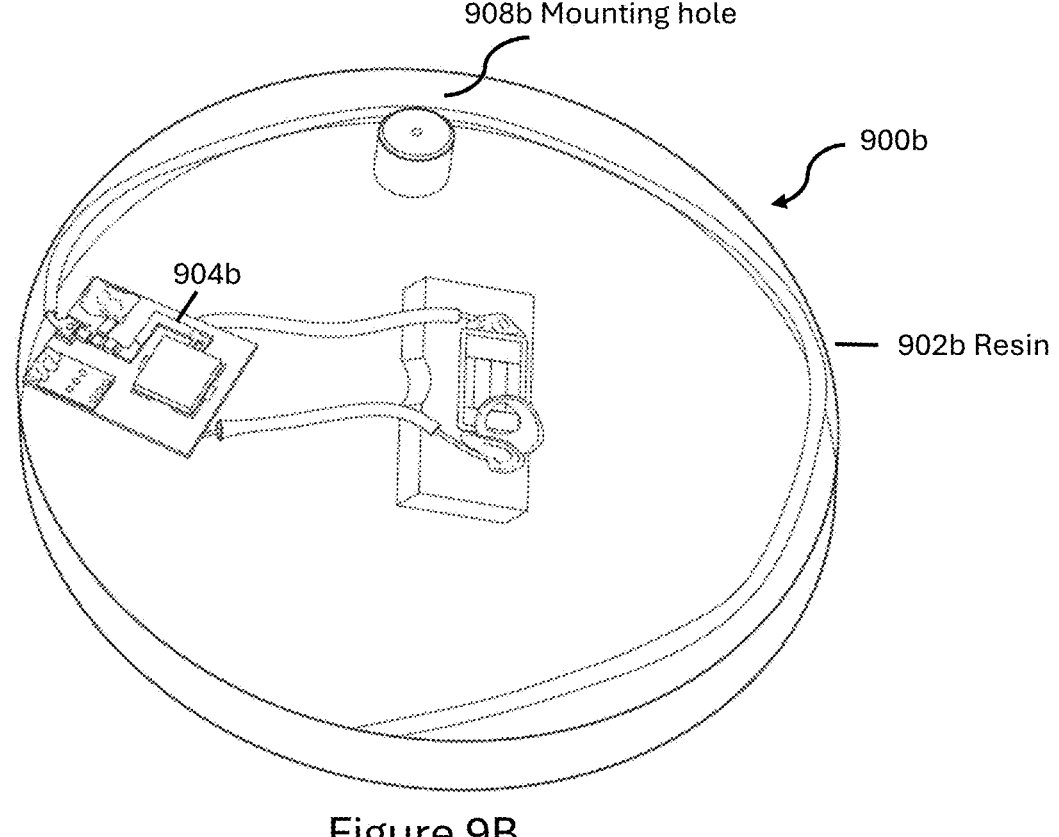

FIG. 9B shows an embodiment in which the encapsulated device 900b is over-molded using resin 902b. In some embodiments, the resin is molded in a cylindrical shape. In some embodiments, in order to transmit or receive signal, the device includes an antenna 904b. In some embodiments, the device 900b is completely encapsulated, sealing the device in resin 902b. In some embodiments, the encapsulated device contains one or more mounting holes 908b to allow for easy attachment of the device to surfaces. In some embodiments, the mounting holes 908b allow the device to be attached to various surfaces using nails or screws.

Figure 9C:
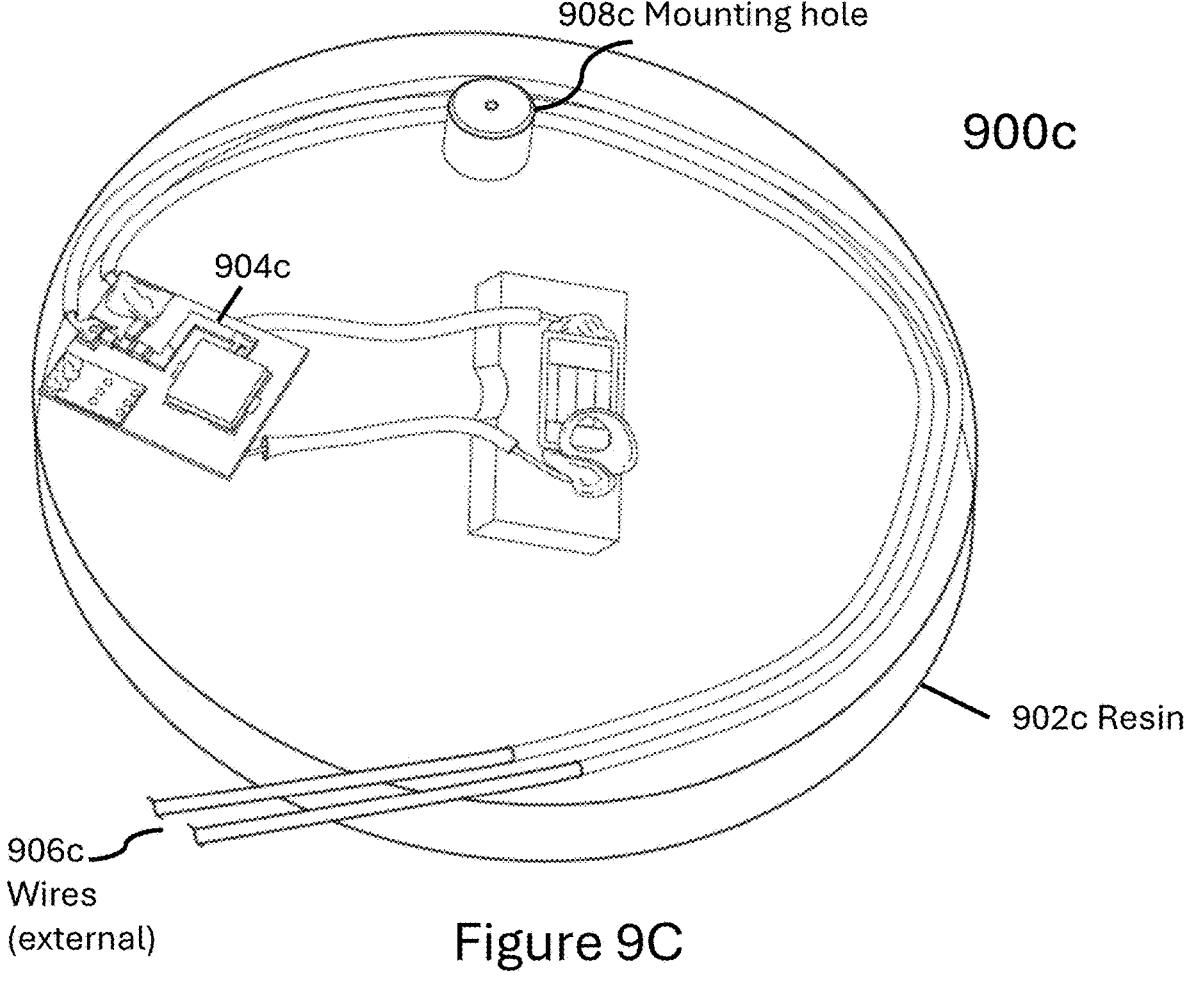

FIG. 9C shows an embodiment in which the encapsulated device 900c is over-molded using resin 902c. In accordance with some embodiments, there are wires 906c extending from the edge of the resin 902c for external connections. In some embodiments, a surface on the edge of the resin 902c is provided to allow the device to make external connections. In some embodiments, the surface is an outlet. In some embodiments, the surface is a jack that allows the device to make external connections. In some embodiments, the encapsulated device contains one or more mounting holes 908c to allow for easy attachment of the device to surfaces. In some embodiments, the mounting holes 908c allow the device to be attached to various surfaces using nails or screws.

Figure 9D:
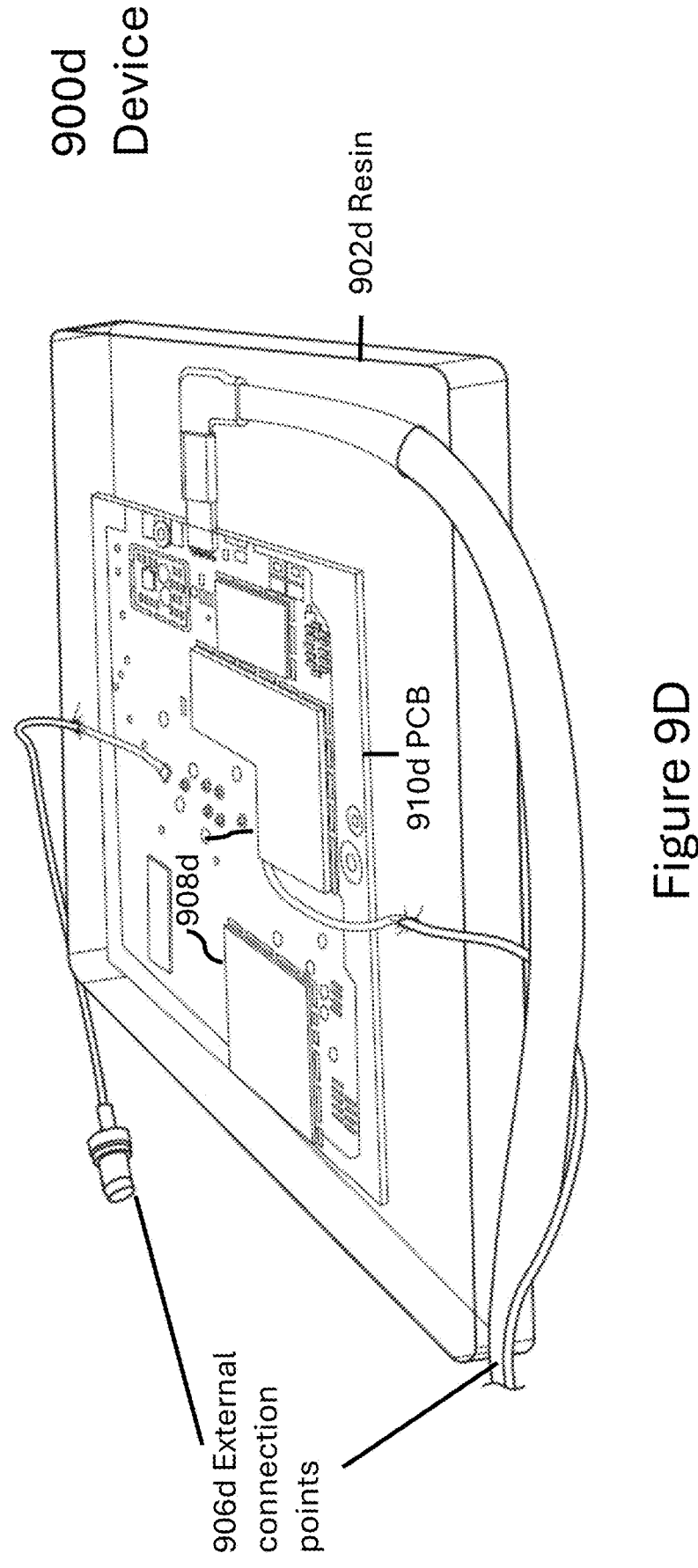

FIG. 9D illustrates a device 900d encapsulated in resin 902d. In some embodiments, various electronic components 908d are located on a PCB 910d. In some embodiments the encapsulated device 900d is a transmitter 1002a. In some embodiments, the various electronic components 908d include a processor 1004, a memory 1006, a transmitter 1014, an antenna array 1010, and various communications components 1012. In some embodiments, the encapsulated device 900d is a receiver 1020. In some embodiments the various electronic components 908d include processor(s) 1040, memory 1042, antenna(s) 1024, power converters 1026, receiver sensor(s) 1028, and various communications components 1044. In some embodiments, this PCB is mounted on a copper heat sink to prevent heat damage during the encapsulation process as described in 700a of FIG. 7A. In some embodiments, there are external connection points 906d extending from the resin 902d encapsulation for external connections. In some embodiments, a surface on the edge of the resin 902d is provided to allow the device to make external connections. In some embodiments, the surface is an outlet. In some embodiments, the surface is a jack that allows the device to make external connections.

FIG. 10 is a block diagram of components of wireless power transmission environment 1000, in accordance with some embodiments. Wireless power transmission environment 1000 includes, for example, transmitters 1002 (e.g., transmitters 1002a, 1002b . . . 1002n) (also referred to as wireless-power-transmitting device and shelving-mounted wireless-power-transmitting device) and one or more receivers 1020 (e.g., receivers 1020a, 1020b . . . 1020n) (also referred to as wireless-power receiver and RF harvesting receiver). In some embodiments, each respective wireless power transmission environment 1000 includes a number of receivers 1020, each of which is associated with a respective electronic device 1022. In some instances, the transmitter 1002 is referred to herein as a "wireless-power-transmitting device" or a "wireless power transmitter." Additionally, in some instances, the receiver 1020 is referred to herein as a "wireless-power-receiving device" or a "wireless-power receiver."

An example transmitter 1002 (e.g., transmitter 1002a) includes, for example, one or more processor(s) 1004, a memory 1006, one or more antenna arrays 1010, one or more communications components 1012 (also referred to herein as a "wireless communications radio," a "communications radio" or simply a "radio"), and/or one or more transmitter sensors 1014. In some embodiments, these components are interconnected by way of a communications bus 1007.

In some embodiments, a single processor 1004 (e.g., processor 1004 of transmitter 1002a) executes software modules for controlling multiple transmitters 1002 (e.g., transmitters 1002b . . . 1002n). In some embodiments, a single transmitter 1002 (e.g., transmitter 1002a) includes multiple processors 1004, such as one or more transmitter processors (configured to, e.g., control transmission of signals 1016 by antenna array 1010), one or more communications component processors (configured to, e.g., control communications transmitted by communications component 1012 and/or receive communications by way of communications component 1012) and/or one or more sensor processors (configured to, e.g., control operation of transmitter sensor 1014 and/or receive output from transmitter sensor 1014).

The wireless-power receiver 1020 receives power transmission signals 1016 and/or data-communication signals 1018 transmitted by transmitters 1002. In some embodiments, the receiver 1020 includes one or more antennas 1024 (e.g., an antenna array including multiple antenna elements), power converter 1026, receiver sensor 1028, and/or other components or circuitry (e.g., processor(s) 1040, memory 1042, and/or communication component(s) 1044). In some embodiments, these components are interconnected by way of a communications bus 1046. References to these components of receiver 1020 cover embodiments in which one or more of these components (and combinations thereof) are included.

The receiver 1020 converts energy from received signals 1016 (also referred to herein as RF power transmission signals, or simply, RF signals, RF waves, power waves, or power transmission signals) into electrical energy to power and/or charge electronic device 1022. For example, the receiver 1020 uses the power converter 1026 to convert energy derived from power waves 1016 to alternating current (AC) electricity or direct current (DC) electricity to power and/or charge the electronic device 1022. Non-limiting examples of the power converter 1026 include rectifiers, rectifying circuits, voltage conditioners, among suitable circuitry and devices.

In some embodiments, the receiver 1020 is a standalone device that is detachably coupled to one or more electronic devices 1022. For example, the electronic device 1022 has processor(s) 1032 for controlling one or more functions of the electronic device 1022, and the receiver 1020 has processor(s) 1040 for controlling one or more functions of the receiver 1020.

In some embodiments, the receiver 1020 is a component of the electronic device 1022. For example, processors 1032 control functions of the electronic device 1022 and the receiver 1020. In addition, in some embodiments, the receiver 1020 includes one or more processors 1040, which communicates with processors 1032 of the electronic device 1022.

In some embodiments, the electronic device 1022 includes one or more processors 1032, memory 1034, one or more communication components 1036, and/or one or more batteries 1030. In some embodiments, these components are interconnected by way of a communications bus 1038. In some embodiments, communications between electronic device 1022 and receiver 1020 occur via communications component(s) 1036 and/or 1044. In some embodiments, communications between the electronic device 1022 and the receiver 1020 occur via a wired connection between communications bus 1038 and communications bus 1046. In some embodiments, the electronic device 1022 and the receiver 1020 share a single communications bus.

In some embodiments, the receiver 1020 receives one or more power waves 1016 directly from the transmitter 1002 (e.g., via one or more antennas 1024). In some embodiments, the receiver 1020 harvests power waves from one or more pockets of energy created by one or more power waves 1016 transmitted by the transmitter 1002. In some embodiments, the transmitter 1002 is a near-field transmitter that transmits the one or more power waves 1016 within a near-field distance (e.g., less than approximately six inches away from the transmitter 1002). In other embodiments, the transmitter 1002 is a far-field transmitter that transmits the one or more power waves 1016 within a far-field distance (e.g., more than approximately six inches away from the transmitter 1002).

After the power waves 1016 are received and/or energy is harvested from them, circuitry (e.g., integrated circuits, amplifiers, rectifiers, and/or voltage conditioner) of the receiver 1020 converts the energy of the power waves to usable power (i.e., electricity), which powers the electronic device 1022 and/or is stored to battery 1030 of the electronic device 1022. In some embodiments, a rectifying circuit of the receiver 1020 translates the electrical energy from AC to DC for use by the electronic device 1022. In some embodiments, a voltage conditioning circuit increases or decreases the voltage of the electrical energy as required by the electronic device 1022. In some embodiments, an electrical relay conveys electrical energy from the receiver 1020 to the electronic device 1022.

In some embodiments, the electronic device 1022 obtains power from multiple transmitters 1002 and/or using multiple receivers 1020. In some embodiments, the wireless power transmission environment 1000 includes a plurality of electronic devices 1022, each having at least one respective receiver 1020 that is used to harvest power waves from the transmitters 1002 into power for charging the electronic devices 1022.

In some embodiments, the one or more transmitters 1002 adjust values of one or more characteristics (e.g., waveform characteristics, such as phase, gain, direction, amplitude, polarization, and/or frequency) of power waves 1016. For example, a transmitter 1002 selects a subset of one or more antenna elements of antenna array 1010 to initiate transmission of power waves 1016, cease transmission of power waves 1016, and/or adjust values of one or more characteristics used to transmit power waves 1016. In some embodiments, the one or more transmitters 1002 adjust power waves 1016 such that trajectories of power waves 1016 converge at a predetermined location within a transmission field (e.g., a location or region in space), resulting in controlled constructive or destructive interference patterns. The transmitter 1002 may adjust values of one or more characteristics for transmitting the power waves 1016 to account for changes at the wireless-power receiver that may negatively impact transmission of the power waves 1016.

Note that, in some embodiments, the transmitter 1002 utilizes beamforming techniques to wirelessly transfer power to a receiver 1020, while in other embodiments, the transmitter 1002 does not utilize beamforming techniques to wirelessly transfer power to a receiver 1020 (e.g., in circumstances in which no beamforming techniques are used, the transmitter controller IC 1060 discussed below might be designed without any circuitry to allow for use of beamforming techniques, or that circuitry may be present, but might be deactivated to eliminate any beamforming control capability).

In some conventional systems, a viable RF power level can be provided to an optional beam-forming integrated circuit (IC) (not shown), which then provides phase-shifted signals to one or more power amplifiers. In such conventional systems, the optional beam-forming IC is used to ensure that power transmission signals sent using two or more antennas wireless-power receivers are transmitted with appropriate characteristics (e.g., phases) to ensure that power transmitted to the particular wireless-power receiver is maximized (e.g., the power transmission signals arrive in phase at the particular wireless-power receiver). The embodiments herein, however, do not always require the use of a beam-forming integrated circuit. In certain embodiments, such a beam-forming integrated circuit (and/or associated algorithm) can be included in the system, but is disabled (or is not included in the system at all) and is not used in conjunction with wirelessly transmitted energy to receiver devices.

In some embodiments, the transmitter controller IC 1060 provides the viable RF power level directly to the one or more power amplifiers and does not use any beam-forming capabilities (e.g., bypasses/disables a beam-forming IC and/ or any associated algorithms if phase-shifting is not required, such as when only a single antenna 1024 is used to transmit power transmission signals to a wireless-power receiver). In some embodiments, only a single antenna is utilized with a single power amplifier (e.g., each of the transmitter devices 10, 20, 22, FIG. 1) can be configured to use a single antenna and a single power amplifier and none of the transmitter devices need make use of active beam-forming control to wirelessly deliver sufficient power to the harvesters.

In some embodiments, the transmitter controller IC 1060 provides the viable RF power level directly to the one or more power amplifier units 1120 and does not use a beam-forming IC. In some embodiments, by not using beam-forming control, there is no active beam-forming control in the power transmission system. For example, in some embodiments, by eliminating the active beam-forming control, the relative phases of the power signals from different antennas are unaltered after transmission. In some embodiments, by eliminating the active beam-forming control, the phases of the power signals are not controlled and remain in a fixed or initial phase.

In some embodiments, respective antenna arrays 1010 of the one or more transmitters 1002 may include a set of one or more antennas configured to transmit the power waves 1016 into respective transmission fields of the one or more transmitters 1002. Integrated circuits of the respective transmitter 1002, such as a controller circuit (e.g., a radio frequency integrated circuit (RFIC)) and/or waveform generator, may control the behavior of the antennas. For example, based on the information received from the receiver 1020 by way of the communication signal 1018, a controller circuit (e.g., processor 1004 of the transmitter 1002, FIG. 12) may determine values of the waveform characteristics (e.g., amplitude, frequency, trajectory, direction, phase, polarization, among other characteristics) of power waves 1016 that would effectively provide power to the receiver 1020, and in turn, the electronic device 1022. The controller circuit may also identify a subset of antennas from the antenna arrays 1010 that would be effective in transmitting the power waves 1016. In some embodiments, a waveform generator circuit (not shown in FIG. 10) of the respective transmitter 1002 coupled to the processor 1004 may convert energy and generate the power waves 1016 having the specific values for the waveform characteristics identified by the processor 1004/controller circuit, and then provide the power waves to the antenna arrays 1010 for transmission.

In some embodiments, the communications component 1012 transmits data-communication signals 1018 by way of a wired and/or wireless communication connection to the receiver 1020. In some embodiments, the communications component 1012 generates data-communication signals 1018 used for triangulation of the receiver 1020 (e.g., test signals). In some embodiments, the data-communication signals 1018 are used to convey information between the transmitter 1002 and receiver 1020 for adjusting values of one or more waveform characteristics used to transmit the power waves 1016 (e.g., convey amounts of power derived from RF test signals). In some embodiments, the data-communication signals 1018 include information related to status, efficiency, user data, power consumption, billing, geo-location, and other types of information.

In some embodiments, the communications component 1012 transmits data-communication signals 1018 to the receiver 1020 by way of the electronic device 1022a. For example, the communications component 1012 may convey information to the communications component 1036 of the electronic device 1022a, which the electronic device 1022a may in turn convey to the receiver 1020 (e.g., via bus 1038).

In some embodiments, the communications component 1012 includes a communications component antenna for communicating with the receiver 1020 and/or other transmitters 1002 (e.g., transmitters 1002b through 1002n). In some embodiments, these data-communication signals 1018 are sent using a first channel (e.g., a first frequency band) that is independent and distinct from a second channel (e.g., a second frequency band distinct from the first frequency band) used for transmission of the power waves 1016.

In some embodiments, the receiver 1020 includes a receiver-side communications component 1044 configured to communicate various types of data with one or more of the transmitters 1002, through a respective communication signal 1018 generated by the receiver-side communications component (in some embodiments, a respective communication signal 1018 is referred to as an advertising signal). The data may include location indicators for the receiver 1020 and/or electronic device 1022, a power status of the device 1022, status information for the receiver 1020, status information for the electronic device 1022, status information about the power waves 1016, and/or status information for pockets of energy. In other words, the receiver 1020 may provide data to the transmitter 1002, by way of the communication signal 1018, regarding the current operation of the system 1000, including: information identifying a present location of the receiver 1020 or the device 1022, an amount of energy (i.e., usable power) received by the receiver 1020, and an amount of power received and/or used by the electronic device 1022, among other possible data points containing other types of information.

In some embodiments, the data contained within data-communication signals 1018 is used by the electronic device 1022, the receiver 1020, and/or the transmitters 1002 for determining adjustments to values of one or more waveform characteristics used by the antenna array 1010 to transmit the power waves 1016. Using a communication signal 1018, the transmitter 1002 communicates data that is used, e.g., to identify receivers 1020 within a transmission field, identify electronic devices 1022, determine safe and effective waveform characteristics for power waves, and/or hone the placement of pockets of energy. In some embodiments, the receiver 1020 uses a communication signal 1018 to communicate data for, e.g., alerting transmitters 1002 that the receiver 1020 has entered or is about to enter a transmission field (e.g., come within wireless-power-transmission range of a transmitter 1002), provide information about the electronic device 1022, provide user information that corresponds to the electronic device 1022, indicate the effectiveness of received power waves 1016, and/or provide updated characteristics or transmission parameters that the one or more transmitters 1002 use to adjust transmission of the power waves 1016.

In some embodiments, the receiver 1020 does not include a distinct communications component 1044. Rather, the receiver 1020 is configured to reflect RF signals transmitted by the transmitter 1002 at the one or more antennas 1024 and, importantly, modulate the reflected RF signals to convey data (or a message) to transmitter 1002. In such embodiments, the transmitter 1002 may also lack a distinct communications component. Instead, the transmitter 1002 may receive the reflected RF signals at the one or more antenna arrays 1010, and the transmitter 1002 may demodulate the reflected RF signals in order to interpret them.

In some embodiments, transmitter sensor 1014 and/or receiver sensor 1028 detect and/or identify conditions of the electronic device 1022, the receiver 1020, the transmitter 1002, and/or a transmission field. In some embodiments, data generated by the transmitter sensor 1014 and/or receiver sensor 1028 is used by the transmitter 1002 to determine appropriate adjustments to values of one or more waveform characteristics used to transmit the power waves 1016. Data from transmitter sensor 1014 and/or receiver sensor 1028 received by the transmitter 1002 includes, e.g., raw sensor data and/or sensor data processed by a processor 1004, such as a sensor processor. Processed sensor data includes, e.g., determinations based upon sensor data output. In some embodiments, sensor data received from sensors that are external to the receiver 1020 and the transmitters 1002 is also used (such as thermal imaging data, information from optical sensors, and others).

Figure 11A:
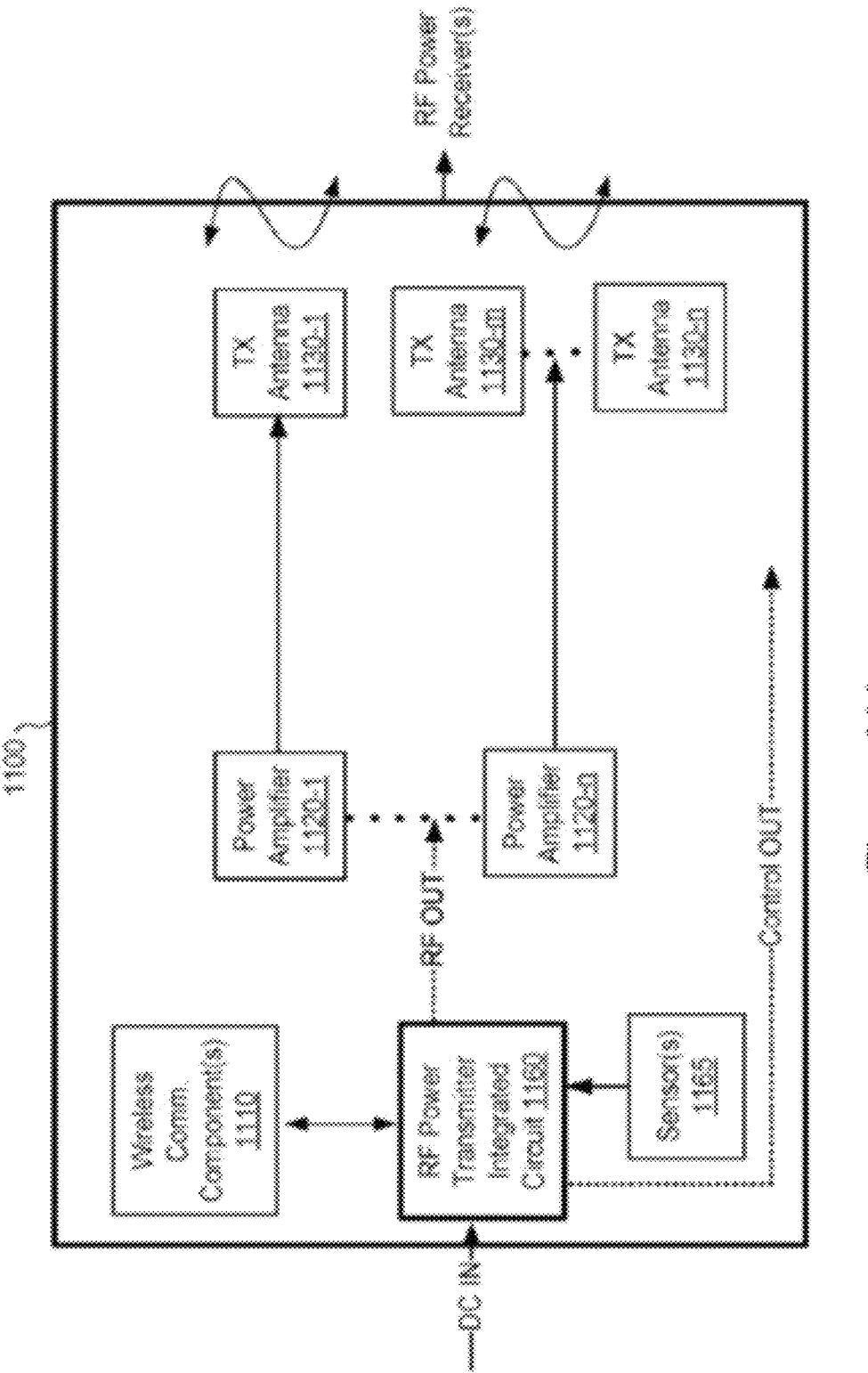
FIG. 11A is a block diagram of a wireless-power transmitter, in accordance with some embodiments.

FIG. 11A is a block diagram of a wireless-power transmitter, in accordance with some embodiments. The block diagram of a wireless-power transmitter 1100 corresponds to an example of the components that can be included within the wireless-power transmitter 1002 described above in reference to FIG. 10. The wireless-power transmitter 1002 can be referred to herein as a near-field (NF) power transmitter device, transmitter, power transmitter, or wireless-power transmitter device. The wireless-power transmitter 1002 includes one or more of one or more communications components 1110, one or more power amplifier units 1120-1, . . . 1120-n, one or more power-transfer elements (e.g., such as antennas 1130-1 to 1130-n (which can be instances of the transmitter antenna elements 1036; FIGS. 1-12D)), an RF Power Transmitter Integrated Circuit (RFIC) 1160 (e.g., analogous to controller 1040 FIG. 10), and one or more sensors 1165.

In some embodiments, the communication component(s) 1110 (e.g., wireless communication components, such as WI-FI or BLUETOOTH radios) enable communication between the wireless-power transmitter 1100 and one or more communication networks. In some embodiments, the communication component(s) 1110 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

In some embodiments, the communication component(s) 1110 receives charging information from a wireless-power receiver (or from an electronic device configured to be charged by the wireless-power receiver, e.g., a wireless-power receiver 1055 described in reference to FIG. 13). In some embodiments, the charging information is received in a packet of information that is received in conjunction with an indication that the wireless-power receiver is located within one meter of the wireless-power transmitter 1035 in FIG. 14. In some embodiments, the charging information includes the location of the wireless-power receiver 1055 within the transmission field of the wireless-power transmitter 1035 (or the surrounding area within the communications component(s) range). For example, communication components 1110, such as BLE communications paths operating at 2.4 GHz, to enable the wireless-power transmitter 1035 to monitor and track the location of the wireless-power receiver 1055. The location of the wireless-power receiver 1055 can be monitored and tracked based on the charging information received from the wireless-power receiver 1055 via the communications components 1110.

In some embodiments, the charging information indicates that a wireless-power receiver 1055 is authorized to receive wirelessly delivered power from the wireless-power transmitter 1035. More specifically, the wireless-power receiver can use a wireless communication protocol (such as BLE) to transmit the charging information as well as authentication information to the one or more integrated circuits (e.g., RFIC 1160) of the wireless-power transmitter 1035. In some embodiments, the charging information also includes general information such as charge requests from the receiver, the current battery level, charging rate (e.g., effectively transmitted power or electromagnetic energy successfully converted to usable energy), device specific information (e.g., temperature, sensor data, receiver requirements or specifications, and/or other receiver specific information), etc.

In some instances, the communication component(s) 1110 are not able to communicate with wireless-power receivers for various reasons, e.g., because there is no power available for the communication component(s) 1110 to use for the transmission of data signals or because the wireless-power receiver itself does not actually include any communication component of its own. As such, in some embodiments, the wireless-power transmitters 1035 described herein are still able to uniquely identify different types of devices and, when a wireless-power receiver 1055 is detected, figure out if that the wireless-power receiver 1055 is authorized to receive wireless-power (e.g., by measuring impedances, reflected power, and/or other techniques).

The one or more power amplifiers 1120 are configured to amplify an electromagnetic signal that is provided to the one or more antennas 1130. In some embodiments, the power amplifier 1120 used in the power transmission system controls both the efficiency and gains of the output of the power amplifier. In some embodiments, the power amplifier used in the power transmission system is a class E power amplifier 1120. In some embodiments, the power amplifier 1120 used in the power transmission system is a Gallium Nitride (GaN) power amplifier. In some embodiments, the wireless-power transmitters 1035 is configured to control operation of the one or more power amplifiers 1120 when they drive one or more antennas 1130. In some embodiments, one or more of the power amplifiers 1120 are a variable power amplifier including at least two power levels. In some embodiments, a variable power amplifier includes one or more of a low power level, median power level, and high power level. As discussed below in further detail, in some embodiments, the wireless-power transmitters 1035 is configured to select power levels of the one or more power amplifiers. In some embodiments, the power (e.g., electromagnetic power) is controlled and modulated at the wireless-power transmitters 1035 via switch circuitry as to enable the wireless-power transmitters 1035 to send electromagnetic energy to one or more wireless receiving devices (e.g., wireless-power receivers 1055) via the one or more antennas 1130.

In some embodiments, the output power of the single power amplifier 1120 is equal or greater than 2 W. In some embodiments, the output power of the single power amplifier 1120 is equal or less than 15 W. In some embodiments, the output power of the single power amplifier 1120 is greater than 2 W and less than 15 W. In some embodiments, the output power of the single power amplifier 1120 is equal or greater than 4 W. In some embodiments, the output power of the single power amplifier 1120 is equal or less than 8 W. In some embodiments, the output power of the single power amplifier 1120 is greater than 4 W and less than 8 W. In some embodiments, the output power of the single power amplifier 1120 is greater than 8 W and up to 50 W.

In some embodiments, by using the single power amplifier 1120 with an output power range from 2 W to 15 W, the electric field within the power transmission range of the antenna 1130 controlled by the single power amplifier 1120 is at or below a SAR value of 1.6 W/kg, which is in compliance with the FCC (Federal Communications Commission) SAR requirement in the United States. In some embodiments, by using a single power amplifier 1120 with a power range from 2 W to 15 W, the electric field within the power transmission range of the antenna 1130 controlled by the single power amplifier 1120 is at or below a SAR value of 2 W/kg, which is in compliance with the IEC (International Electrotechnical Commission) SAR requirement in the European Union. In some embodiments, by using a single power amplifier 1120 with a power range from 2 W to 15 W, the electric field within the power transmission range of the antenna 1130 controlled by the single power amplifier 1120 is at or below a SAR value of 0.8 W/kg. In some embodiments, by using a single power amplifier 1120 with a power range from 2 W to 15 W, the electric field within the power transmission range of the antenna 1130 controlled by the single power amplifier 1120 is at or below any level that is regulated by relevant rules or regulations. In some embodiments, the SAR value in a location of the radiation profile of the antenna decreases as the range of the radiation profile increases.

In some embodiments, the radiation profile generated by the antenna controlled by a single power amplifier is defined based on how much usable power is available to a wireless-power receiver when it receives electromagnetic energy from the radiation profile (e.g., rectifies and converts the electromagnetic energy into a usable DC current), and the amount of usable power available to such a wireless-power receivers 1055 can be referred to as the effective transmitted power of an electromagnetic signal. In some embodiments, the effective transmitted power of the electromagnetic signal in a predefined radiation profile is at least 0.5 W. In some embodiments, the effective transmitted power of the signal in a predefined radiation profile is greater than 1 W. In some embodiments, the effective transmitted power of the signal in a predefined radiation profile is greater than 2 W. In some embodiments, the effective transmitted power of the signal in a predefined radiation profile is greater than 5 W. In some embodiments, the effective transmitted power of the signal in a predefined radiation profile is less or equal to 4 W.

Figure 11B:
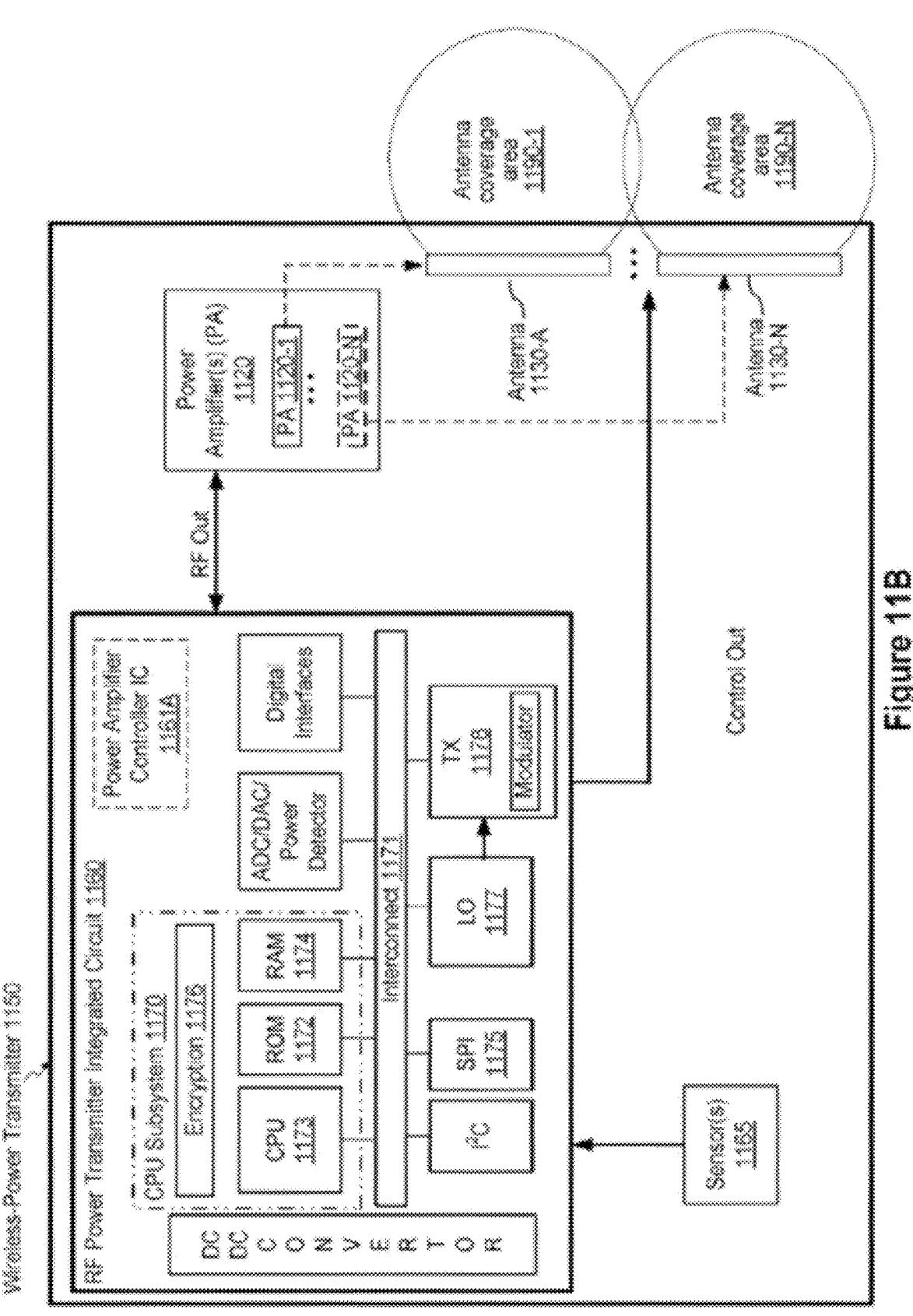
FIG. 11B is a block diagram of another wireless-power transmitter including an RF power transmitter integrated circuit, one or more sensors, one or more antennas, and/or a power amplifier, in accordance with some embodiments.

FIG. 11B is a block diagram of another wireless-power transmitter 1150 (e.g., wireless-power receiver 1035) including an RF power transmitter integrated circuit 1160, one or more sensors 1165, one or more antennas 1130, and/or a power amplifier 1120 in accordance with some embodiments. For ease of discussion and illustration, the other wireless-power transmitters 1150 can be an instance of the wireless-power transmitter devices described above in reference to FIGS. 1-13, and includes one or more additional and/or distinct components, or omits one or more components. In some embodiments, the RFIC 1160 includes a CPU subsystem 1170, an external device control interface, a subsection for DC to power conversion, and analog and digital control interfaces interconnected via an interconnection component, such as a bus or interconnection fabric block 1171. In some embodiments, the CPU subsystem 1170 includes a microprocessor unit (CPU) 1173 with related Read-Only-Memory (ROM) 1172 for device program booting via a digital control interface, e.g., an 12C port, to an external FLASH containing the CPU executable code to be loaded into the CPU Subsystem Random Access Memory (RAM) 1174 (e.g., memory 1006, FIG. 10) or executed directly from FLASH. In some embodiments, the CPU subsystem 1370 also includes an encryption module or block 1176 to authenticate and secure communication exchanges with external devices, such as wireless-power receivers that attempt to receive wirelessly delivered power from the Wireless-power transmitters 1035. In some embodiments, the wireless-power transmitters 1035 may also include a temperature monitoring circuit (not shown) that is in communication with the CPU subsystem 1170 to ensure that the wireless-power transmitters 1035 remains within an acceptable temperature range. For example, if a determination is made that the wireless-power transmitters 1035 has reached a threshold temperature, then operation of the wireless-power transmitters 1035 may be temporarily suspended until the wireless-power transmitters 1035 falls below the threshold temperature.

In some embodiments, the RFIC 1160 also includes (or is in communication with) a power amplifier controller IC (PAIC) 1161A that is responsible for controlling and managing operations of a power amplifier, including, but not limited to, reading measurements of impedance at various measurement points within the power amplifier, instructing the power amplifier to amplify the electromagnetic signal, synchronizing the turn on and/or shutdown of the power amplifier, optimizing performance of the power amplifier, protecting the power amplifier, and other functions discussed herein. In some embodiments, the impedance measurement are used to allow the wireless-power transmitters 1035 (via the RFIC 1160 and/or PAIC 1161A) to detect of one or more power amplifiers, assess one or more safety thresholds, detect changes in the impedance at the one or more power amplifiers, detect movement of the receiver within the wireless transmission field, protect the power amplifier from damage (e.g., by shutting down the power amplifier, changing a selected power level of the power amplifier, and/or changing other configurations of the wireless-power transmitters 1035), classify a receiver (e.g., authorized receivers, unauthorized receivers, and/or receiver with an object), compensate for the power amplifier (e.g., by making hardware, software, and/or firmware adjustments), tune the wireless-power transmitters 1035, and/or other functions.

In some embodiments, the PAIC 1161A may be on the same integrated circuit as the RFIC 1160. Alternatively, in some embodiments, the PAIC 1161A may be on its own integrated circuit that is separate from (but still in communication with) the RFIC 1160. In some embodiments, the PAIC 1161A is on the same chip with one or more of the power amplifiers 1120. In some other embodiments, the PAIC 1161A is on its own chip that is a separate chip from the power amplifiers 1320. In some embodiments, the PAIC 1161A may be on its own integrated circuit that is separate from (but still in communication with) the RFIC 1160 enables older systems to be retrofitted. In some embodiments, the PAIC 1161A as a standalone chip communicatively coupled to the RFIC 1160 can reduce the processing load and potential damage from over-heating. Alternatively or additionally, in some embodiments, it is more efficient to design and use two different ICs (e.g., the RFIC 1160 and the PAIC 1161A).

In some embodiments, executable instructions running on the CPU (such as those shown in the memory 1206 in FIG. 12, and described below) are used to manage operation of the wireless-power transmitters 1035 and to control external devices through a control interface, e.g., SPI control interface 1175, and the other analog and digital interfaces included in the RFIC 1160. In some embodiments, the CPU subsystem 1170 also manages operation of the subsection of the RFIC 1160, which includes a local oscillator (LO) 1177 and a transmitter (TX) 1178. In some embodiments, the LO 1177 is adjusted based on instructions from the CPU subsystem 1170 and is thereby set to different desired frequencies of operation, while the TX converts, amplifies, modulates the output as desired to generate a viable power level.

In some embodiments, the RFIC 1360 and/or PAIC 1161A provide the viable power level (e.g., via the TX 1178) directly to the one or more power amplifiers 1120 and does not use any beam-forming capabilities (e.g., bypasses/disables a beam-forming IC and/or any associated algorithms if phase-shifting is not required, such as when only a single antenna 1130 is used to transmit power transmission signals to a wireless-power receiver 1055). In some embodiments, by not using beam-forming control, there is no active beam-forming control in the power transmission system. For example, in some embodiments, by eliminating the active beam-forming control, the relative phases of the power signals from different antennas are unaltered after transmission. In some embodiments, by eliminating the active beam-forming control, the phases of the power signals are not controlled and remain in a fixed or initial phase. In some embodiments, the RFIC 1160 and/or PAIC 1161A regulate the functionality of the power amplifiers 1120 including adjusting the viable power level to the power amplifiers

1120, enabling the power amplifiers 1120, disabling the power amplifiers 1120, and/or other functions.

Various arrangements and couplings of power amplifiers 1120 to antenna coverage areas 1190 allow the wireless-power receiver 1055 to sequentially or selectively activate different antenna coverage areas 1190 (i.e., power transfer points) in order to determine the most efficient and safest (if any) antenna coverage area 1190 to use for transmitting wireless-power to a wireless-power receiver 1055.

In some embodiments, the one or more power amplifiers 1120 are also controlled by the CPU subsystem 1170 to allow the CPU 1173 to measure output power provided by the power amplifiers 1120 to the antenna coverage areas (i.e., plurality of power-transfer points 202) of the wireless-power transmitter 1035. In some embodiments, the one or more power amplifiers 1120 are controlled by the CPU subsystem 1170 via the PAIC 1161A. In some embodiments, the power amplifiers 1120 may include various measurement points that allow for at least measuring impedance values that are used to enable the foreign object detection techniques, receiver and/or foreign object movement detection techniques, power amplifier optimization techniques, power amplifier protection techniques, receiver classification techniques, power amplifier impedance detection techniques, and/or other safety techniques described in commonly-owned U.S. patent application Ser. No. 16/932,631, which is incorporated by reference in its entirety for all purposes.

Figure 12:
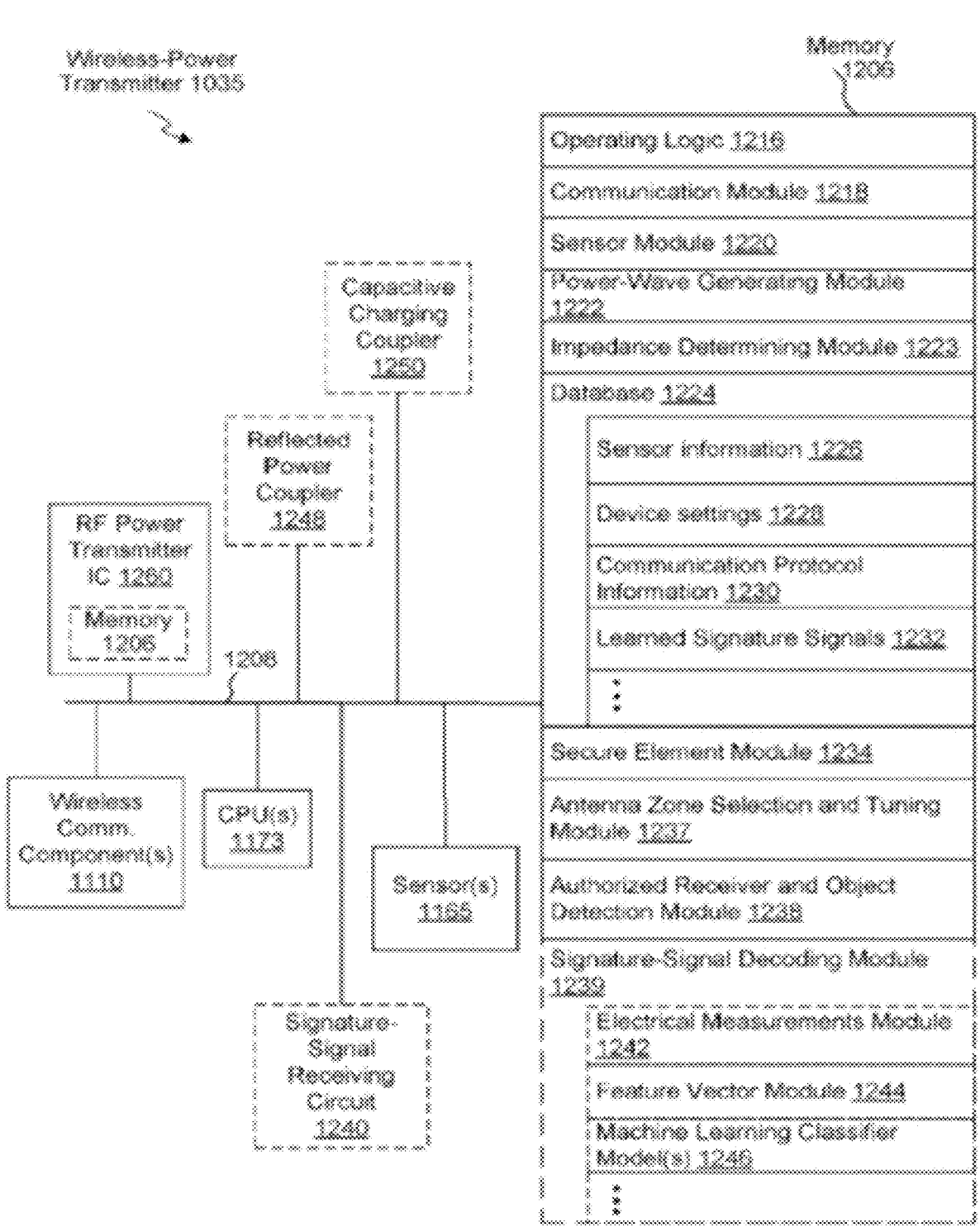
FIG. 12 is a block diagram illustrating one or more components of a wireless-power transmitter, in accordance with some embodiments.

FIG. 12 is a block diagram illustrating one or more components of a wireless-power transmitter 1035, in accordance with some embodiments. In some embodiments, the wireless-power transmitter 1035 includes an RFIC 1160 (and the components included therein, such as a PAIC 1161A and others described above in reference to FIGS. 11A-11B), memory 1206 (which may be included as part of the RFIC 1160, such as nonvolatile memory 1206 that is part of the CPU subsystem 1170), one or more CPUs 1173, and one or more communication buses 1208 for interconnecting these components (sometimes called a chipset). In some embodiments, the wireless-power transmitter 1035 includes one or more sensors 1165. In some embodiments, the wireless-power transmitter 1035 includes one or more output devices such as one or more indicator lights, a sound card, a speaker, a small display for displaying textual information and error codes, etc. In some embodiments, the wireless-power transmitter 1035 includes a location detection device, such as a GPS other geo-location receiver, for determining the location of the wireless-power transmitter 1035.

In some embodiments, the one or more sensors 1165 include one or more capacitive sensors, inductive sensors, ultrasound sensors, photoelectric sensors, time-of-flight sensors (e.g., IR sensors, ultrasonic time-of-flight sensors, phototransistor receiver systems, etc.), thermal radiation sensors, ambient temperature sensors, humidity sensors, IR sensors or IR LED emitter, occupancy sensors (e.g., RFID sensors), ambient light sensors, motion detectors, accelerometers, heat detectors, hall sensors, proximity sensors, sound sensors, pressure detectors, light and/or image sensors, and/or gyroscopes, as well as integrated sensors in one or more antennas.

In some embodiments, the wireless-power transmitter 1035 further includes an optional signature-signal receiving circuit 1240, an optional reflected power coupler 1248, and an optional capacitive charging coupler 1250.

The memory 1206 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 1206, or alternatively the non-volatile memory within memory 1206, includes a non-transitory computer-readable storage medium. In some embodiments, the memory 1206, or the non-transitory computer-readable storage medium of the memory 1206, stores programs, modules, and data structures, or a subset or superset, including operating logic 1216 including procedures for handling various basic system services and for performing hardware dependent tasks, communication module 1228 for coupling to and/or communicating with remote devices (e.g., remote sensors, transmitters, receivers, servers, mapping memories, etc.) in conjunction with wireless communication component(s) 1110, sensor module 1220 for obtaining and processing sensor data (e.g., in conjunction with sensor(s) 1365) to, for example, determine or detect the presence, velocity, and/or positioning of object in the vicinity of the wireless-power transmitter 1035 as well as classify a detected object, power-wave generating module 1222 for generating and transmitting power transmission signals (e.g., in conjunction with antenna coverage areas 1190 and the antennas 1130 respectively included therein), including but not limited to, forming pocket(s) of energy at given locations, and controlling and/or managing the power amplifier (e.g., by performing one or functions of the PAIC 1361A). Optionally, the power-wave generating module 1222 may also be used to modify values of transmission characteristics (e.g., power level (i.e., amplitude), phase, frequency, etc.) used to transmit power transmission signals by individual antenna coverage areas. In some embodiments, the memory 1206 includes impedance determining module 1223 for determining an impedance of the power amplifier based on parametric parameters obtained from one or more measurement points within the wireless-power transmitter 1035 (e.g., determining an impedance using one or more Smith charts). Impedance determining module 1223 may also be used to determine the presence of a foreign object, classify a receiver, detect changes in impedances, detect movement of a foreign object and/or receiver, determine optimal and/or operational impedances, as well as a number of other functions. In some embodiments, memory 1206 includes database 1224, which includes, but is not limited to: sensor information 1226 for storing and managing data received, detected, and/or transmitted by one or more sensors (e.g., sensors 1165 and/or one or more remote sensors), device settings 1228 for storing operational settings for the wireless-power transmitter 1035 and/or one or more remote devices including, but not limited to, lookup tables (LUT) s for SAR, e-field roll-off, producing a certain radiation profile from among various radiation profiles, Smith Charts, antenna tuning parameters, and/or values associated with parametric parameters of the wireless-power transmitter 1035 for different configurations (e.g., obtained during simulation, characterization, and/or manufacture tests of the wireless-power transmitter 1035 and/or updated during operation (e.g., learned improvements to the system)). Alternatively, raw values can be stored for future analysis, Communication protocol information 1230 for storing and managing protocol information for one or more protocols (e.g., custom or standard wireless protocols, such as ZigBee, Z-Wave, etc. and/or custom or standard wired protocols, such as Ethernet), and optional learned signature signals 1232 for a variety of different wireless-power receivers and other objects (which are not wireless-power receivers).

In some embodiments, memory 1206 includes a secure element module 1234 for determining whether a wireless-power receiver is authorized to receive wirelessly delivered power from the wireless-power transmitter 1035, an antenna zone selection and tuning module 1237 for coordinating a process of transmitting test power transmission signals to an antenna 1230 (e.g., antenna element 1036) with various antenna coverage areas (i.e., power-transfer points) to determine which antenna coverage area (i.e., power-transfer point) should be used to wirelessly deliver power to various wireless-power receivers as described herein (additional examples and embodiments are provided in reference to FIGS. 9A-9B of PCT Patent Application No. PCT/US2019/015820 (U.S. Pat. No. 10,615,647), which is incorporated by reference in its entirety for all purposes, and also provided in PCT/US2017/065886 (U.S. Pat. No. 10,256,677), which is incorporated by reference in its entirety for all purposes).

In some embodiments, memory 1206 includes an authorized receiver and object detection module 1238 used for detecting various signature signals from wireless-power receivers and from other objects, and then determining appropriate actions based on the detecting of the various signature signals (as is explained in more detail in reference to FIGS. 9A-9B of PCT Patent Application No. PCT/US2019/015820 (U.S. Pat. No. 10,615,647), which is incorporated by reference in its entirety for all purposes; also explained in more detail in PCT/US2017/065886 (U.S. Pat. No. 10,256,677), which is incorporated by reference in its entirety for all purposes). In some embodiments memory 1206 includes a signature-signal decoding module 1239 used to decode the detected signature signals and determine message or data content. In some embodiments, the module 1239 includes an electrical measurement module 1242 to collect electrical measurements from one or more receivers (e.g., in response to power beacon signals), a feature vector module 1244 to compute feature vectors based on the electrical measurements collected by the electrical measurement module 1239, and/or machine learning classifier model(s) 1246 that are trained to detect and/or classify foreign objects (additional detail provided in commonly-owned U.S. Patent Publication No. 2019/0245389, which is incorporated by reference herein for all purposes).

Each of the above-identified elements (e.g., modules stored in memory 1206 of the wireless-power transmitter 1035) is optionally stored in one or more of the previously mentioned memory devices and corresponds to a set of instructions for performing the function(s) described above. The above-identified modules or programs (e.g., sets of instructions) need not be implemented as separate software programs, procedures, or modules, and thus various subsets of these modules are optionally combined or otherwise rearranged in various embodiments. In some embodiments, the memory 1206, optionally, stores a subset of the modules and data structures identified above.

FIG. 13 is a block diagram illustrating a representative wireless-power receiver 1055 (also sometimes interchangeably referred to herein as a receiver, or power receiver), in accordance with some embodiments. In some embodiments, the wireless-power receiver 1055 includes one or more processing units (e.g., CPUs, ASICs, FPGAS, microprocessors, and the like) 1352, one or more communication components 1354, memory 1356, antenna(s) 1360 (which can be instances receiver antenna elements 104; FIGS. 1A-3B), power harvesting circuitry 1359 (e.g., PCB 108; FIGS. 1A-3B), and one or more communication buses 1358 for interconnecting these components (sometimes called a chipset). In some embodiments, the wireless-power receiver 1055 includes one or more optional sensors 1362, similar to the one or sensors 1028 and 1165 described above with reference to FIGS. 10 and 11, respectively. In some embodiments, the wireless-power receiver 1055 includes an energy storage device 1361 for storing energy harvested via the power harvesting circuitry 1359. In various embodiments, the energy storage device 1361 includes one or more batteries, one or more capacitors, one or more inductors, and the like.

In some embodiments, the power harvesting circuitry 1359 includes one or more rectifying circuits and/or one or more power converters. In some embodiments, the power harvesting circuitry 1359 includes one or more components (e.g., a power converter) configured to convert energy from power waves and/or energy pockets to electrical energy (e.g., electricity). In some embodiments, the power harvesting circuitry 1359 is further configured to supply power to a coupled electronic device, such as a laptop or phone. In some embodiments, supplying power to a coupled electronic device includes translating electrical energy from an AC form to a DC form (e.g., usable by the electronic device).

In some embodiments, the wireless-power receiver 1055 includes one or more output devices such as one or more indicator lights, a sound card, a speaker, a small display for displaying textual information and error codes, etc. In some embodiments, the wireless-power receiver 1055 includes a location detection device, such as a GPS (global positioning satellite) or other geo-location receiver, for determining the location of the wireless-power transmitter 1055.

In various embodiments, the one or more sensors 1362 include one or more thermal radiation sensors, ambient temperature sensors, humidity sensors, IR sensors, occupancy sensors (e.g., RFID sensors), ambient light sensors, motion detectors, accelerometers, and/or gyroscopes. It is noted that the foreign object detection techniques can operate without relying on the one or more sensor(s) 1362.

The communication component(s) 1354 enable communication between the wireless-power receiver 1055 and one or more communication networks. In some embodiments, the communication component(s) 1354 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. It is noted that the foreign object detection techniques can operate without relying on the communication component(s) 1354.

The communication component(s) 1354 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 1356 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 1356, or alternatively the non-volatile memory within memory 1356, includes a non-transitory computer-readable storage medium. In some embodiments, the memory 1356, or the non-transitory computer-readable storage medium of the memory 1356, stores programs, modules, and data structures, or a subset or superset thereof. In some embodiments, the stored programs, modules and data structures include operating logic 1366, which includes procedures for handling various basic system services and for performing hardware dependent tasks, a communication module 1368 for coupling to and/or communicating with remote devices (e.g., remote sensors, transmitters, receivers, servers, mapping memories, etc.) in conjunction with communication component(s) 1354, an optional sensor module 1370 for obtaining and processing sensor data (e.g., in conjunction with sensor(s) 1362) to, for example, determine the presence, velocity, and/or positioning of a wireless-power receiver 1055, a wireless-power transmitter 1055, or an object in the vicinity of the wireless-power transmitter 1055, wireless power-receiving module 1372 for receiving (e.g., in conjunction with antenna(s) 1360 and/or power harvesting circuitry 1359) energy from capacitively-conveyed electrical signals, power waves, and/or energy pockets, optionally converting (e.g., in conjunction with power harvesting circuitry 1359) the energy (e.g., to direct current), transferring the energy to a coupled electronic device, and storing the energy (e.g., in conjunction with energy storage device 1361). In some embodiments, the stored programs, modules, and data structures include a database 1374, including but not limited to: sensor information 1376 for storing and managing data received, detected, and/or transmitted by one or more sensors (e.g., sensors 1362 and/or one or more remote sensors), device settings 1378 for storing operational settings for the wireless-power transmitter 1055, a coupled electronic device, and/or one or more remote devices, and communication protocol information 1380 for storing and managing protocol information for one or more protocols (e.g., custom or standard wireless protocols, such as ZigBee, Z-Wave, etc. and/or custom or standard wired protocols, such as Ethernet), a secure element module 1382 for providing identification information to the wireless-power transmitter 1035 (e.g., the wireless-power transmitter 1035 uses the identification information to determine if the wireless-power receiver 1304 is authorized to receive wirelessly delivered power), and an optional signature-signal generating module 1383 used to control (in conjunction with the signature-signal generating circuit 1310) various components to cause impedance changes at the antenna(s) 1360 and/or power harvesting circuitry 1359 to then cause changes in reflected power as received by a signature-signal receiving circuit 1240.

Each of the above-identified elements (e.g., modules stored in memory 1356 of the receiver 1304) is optionally stored in one or more of the previously mentioned memory devices, and corresponds to a set of instructions for performing the function(s) described above. The above-identified modules or programs (e.g., sets of instructions) need not be implemented as separate software programs, procedures, or modules, and thus various subsets of these modules are optionally combined or otherwise rearranged in various embodiments. In some embodiments, the memory 1356, optionally, stores a subset of the modules and data structures identified above. Furthermore, the memory 1356, optionally, stores additional modules and data structures not described above, such as an identifying module for identifying a device type of a connected device (e.g., a device type for an electronic device that is coupled with the receiver 1304). In some embodiments, the near-field power transmitters disclosed herein may use adaptive loading techniques to optimize power transfer. Such techniques are described in detail in commonly-owned and incorporated-by-reference PCT Application No. PCT/US2017/065886 and, in particular, in reference to FIGS. 3-8 and 12-15 of PCT Application No. PCT/US2017/065886.

In some embodiments, the wireless-power transmitter 1055 is coupled to or integrated with an electronic device, such as shelving unit, a pen, a marker, a phone, a tablet, a laptop, a hearing aid, smart glasses, headphones, computer accessories (e.g., mouse, keyboard, remote speakers), and/or other electrical devices. In some embodiments, the wireless-power transmitter 1055 is coupled to or integrated with small consumer device, such as a fitness band, a smart watch, and/or other wearable product. Alternatively, in some embodiments, the wireless-power transmitter 1055 is an electronic device.

In accordance with some embodiments, a wireless-power harvester integrated in a small form-factor device (e.g., less than or equal to 100 mm in length, 70 mm in width and 30 mm in depth) (e.g., 50-100 mm in length, 35-70 mm in width, and 15-30 mm in depth) (e.g., an example small form-factor device such as the electronic device 102 shown in FIGS. 1A-1B, 2, and 3A-3B), comprises a stamped metal harvesting antenna configured to harvest radio frequency (RF) power waves, the stamped metal antenna formed into a meandering shape (e.g., FIGS. 1A-1B, 2, and 3A-3B each illustrate harvester antenna 104 that follows a meandering path). The meandering shape includes a predetermined number of turns (e.g., FIGS. 1A-1B, 2, and 3A-3B each illustrate harvester antenna 104 having at least two turns). Specifically, FIG. 1B shows in a bounding box a first turn 161. A first end of the meandering shape is a free end positioned within free space of a housing of a small form-factor device, and a second end of the meandering shape is coupled to a PCB that includes electrical components for operating and powering the small form-factor device. The PCB configured to operate as a ground plane for the stamped metal antenna (e.g., FIGS. 1B and 2 illustrate harvester antenna 104 coupled to the PCB 108 of the electronic device 102 and a receiver integrated circuit 156). An intermediate portion, disposed between the first end and the second end, of the meandering shape is coupled to power-conversion circuitry that is separate from the PCB, the power-conversion circuitry is configured to convert the one or more RF power waves harvested by the stamped metal harvesting antenna into usable energy for charging a battery of the small form-factor device or for powering the small form-factor device (e.g., FIGS. 1B and 2 illustrate an intermediate portion 164 of the receiving antenna 104 being coupled to a receiver integrated circuit 156, and FIG. 10 illustrates a battery 1030).

In some embodiments, the small form-factor device is a digital price tag including a display (e.g., an e-ink display, an LCD display, etc.,) powered by the battery. The display and the battery being coupled to the PCB. For example, FIG. 1A illustrates that the electronic device 102 includes a display 106 that is configured to be a digital price tag.

In some embodiments, the small form-factor device is a digital thermometer powered by the battery. In some embodiments, the thermometer can include a display and/or provide data to a computer or server. In some embodiments, other measurement or stock tracking devices can be used. For example, a scale, a counter (e.g., identifying a number of objects on a shelf). In some embodiments, shopping carts with displays can also be included.

In some embodiments, the power-conversion circuitry is on a substrate distinct from the PCB.

In some embodiments, the stamped metal harvesting antenna is quasi omnidirectional. For example, FIG. 1B illustrates that the harvester antenna 104 is quasi omnidirectional and configured to receive wireless power with any polarization. In some embodiments, the antenna is configured to receive wireless power with any polarization.

In some embodiments, the stamped metal harvesting antenna is coupled to an edge of the PCB. For example, FIGS. 1B and 2 illustrate harvester antenna 104 coupled to the PCB 108 of the electronic device 102 and a receiver integrated circuit 156. In some embodiments, the harvesting antenna can be attached to any edge portion of the PCB.

In some embodiments, the stamped metal harvesting antenna is modular, such that it can be interchangeably coupled with the PCB and the power-conversion circuitry at a first point in time, and separately coupled with a different PCB of a different small form-factor device and different power-conversion circuitry at a second point in time that is distinct from the first point in time. In some embodiments, the harvesting antenna can be designed to accommodate any configuration of the small form-factor device. In some embodiments, the harvesting antenna is easy and inexpensive to manufacture. In some embodiments, the harvesting antenna can be installed by either the manufacturer of the harvesting antenna or the purchaser of the harvesting antenna (e.g., the client).

In some embodiments, the stamped metal antenna occupies a first area of the housing of the small form-factor device that is adjacent to a second area of the housing occupied by the PCB, and the first and second areas are non-overlapping. For example, FIGS. 1B, 2, and 3A-3B illustrates the PCB 108 being in a non-overlapping adjacent location to the antenna 104. Specifically, FIG. 1B shows a first area 109 that contains the PCB 108, and a second area 111 that contains the antenna 104 and related componentry.

In some embodiments, the RF power waves have a centering operating frequency of 918 MHz.

In some embodiments, the stamped metal harvesting antenna has a gain of at least 2 dB. For example, FIG. 4 illustrates a harvesting antenna radiation pattern having a gain of at least 2 dB.

In some embodiments, the predetermined number of turns is two. For example, FIGS. 1A-1B, 2, and 3A-3B each illustrate harvester antenna 104 having at least two turns.

In some embodiments, the battery is a 60 to 100 mAh battery (e.g., battery 1030 in FIG. 10).

In some embodiments, the stamped metal harvesting antenna has a thickness of 1 mm to 2 mm.

In some embodiments, the stamped metal harvesting antenna has a width of 0.5 inch to 2 inches.

In some embodiments, the small form-factor device includes a communications component that is coupled to the PCB, the communication component configured to receive data that allows the small form-factor device to display graphical information. For example, electronic device 102 includes a communications component (e.g., communications component 1036 and/or 1044; FIG. 10). In some embodiments, the data regarding the number of objects on a shelf is displayed. In some embodiments, the display can display information for updating a price or other information (e.g., product name or description). In some embodiments, the display can be used to display an estimate of the price of a virtual shopping cart/list of a shopper in front of the display.

In some embodiments, the graphical information is displayed using a text-only display of the small form-factor device. In some embodiments, the small form-factor device is further configured to communicatively couple to a wireless-power transmitter and provide charging information (e.g., battery life, amount of power received, charge requests, etc.).

In another aspect, a small form-factor device (e.g., less than or equal to 100 mm in length, 70 mm in width and 30 mm in depth) (e.g., 50-100 mm in length, 35-70 mm in width, and 15-30 mm in depth), comprises a wireless-power harvester. The wireless-power harvester includes a stamped metal harvesting antenna configured to harvest radio frequency (RF) power waves, the stamped metal antenna formed into a meandering shape. The meandering shape includes a predetermined number of turns, a first end of the meandering shape is a free end positioned within free space of a housing of a small form-factor device, and a second end of the meandering shape is coupled to a PCB that includes electrical components for operating and powering the small form-factor device. The PCB is configured to operate as a ground plane for the stamped metal antenna. In some embodiments, an intermediate portion, disposed between the first end and the second end of the meandering shape is coupled to power-conversion circuitry that is separate from the PCB. The power-conversion circuitry is configured to convert the one or more RF power waves harvested by the stamped metal harvesting antenna into usable energy for charging a battery of the small form-factor device or for powering the small form-factor device.

In another aspect, a shelving-mounted wireless-power-transmitting device is configured to transmit RF power waves to a wireless-power harvester device that is integrated in a small form-factor device. For example, FIG. 3 illustrates a front view 300 of a shelving system 301 that includes a shelving-mounted wireless-power transmitter system 304 placed at the top of the shelving system 301 for transmitting RF power waves to one or more electronic devices 102. In some embodiments, the wireless-power harvester device integrated in the small form-factor device (e.g., less than or equal to 100 mm in length, 70 mm in width and 30 mm in depth) (e.g., 50-100 mm in length, 35-70 mm in width, and 15-30 mm in depth) (e.g., an example small form-factor device such as the electronic device 102 shown in FIGS. 1A-1B, 2, and 3A-3B), includes a stamped metal harvesting antenna configured to harvest radio frequency (RF) power waves, the stamped metal antenna formed into a meandering shape (e.g., FIGS. 1A-1B, 2, and 3A-3B each illustrate harvester antenna 104 that follows a meandering path). The meandering shape of the stamped metal harvesting antenna includes a predetermined number of turns. The stamped metal harvesting antenna includes a first end of the meandering shape is a free end positioned within free space of a housing of a small form-factor device, and a second end of the meandering shape is coupled to a PCB that includes electrical components for operating and powering the small form-factor device. The PCB configured to operate as a ground plane for the stamped metal antenna (e.g., FIGS. 1B and 2 illustrate harvester antenna 104 coupled to the PCB 108 of the electronic device 102 and a receiver integrated circuit 156). An intermediate portion, disposed between the first end and the second end of the meandering shape is coupled to power-conversion circuitry that is separate from the PCB. The power-conversion circuitry is configured to convert the one or more RF power waves harvested by the stamped metal harvesting antenna into usable energy for charging a battery of the small form-factor device or for powering the small form-factor device (e.g., FIGS. 1B and 2 illustrate an intermediate portion 164 of the receiving antenna 104 being coupled to a receiver integrated circuit 156, and FIG. 10 illustrates a battery 1030).

In some embodiments, each conductive segment of the first plurality of conductive segments and the second plurality of conductive segments are separated by a predetermined gap. In some embodiments, the gap is between 0.1 inches and 0.5 inches. The gap distance is determined based on the predetermined height and the predetermined width of the shelving structure. In some embodiments, each segment of the first plurality of conductive segments or each segment of the second plurality of conductive segments are coupled together via a feedline. In some embodiments, each conductive segment has a length and width. In some embodiments, the conductive segment length is approximately 1.5 inches and the antenna element width is approximately 0.5 inches. In some embodiments, the conductive segment length and width is determined based on the predetermined height and the predetermined width of the shelving unit's structure.

In some embodiments, shelving-mounted wireless-power-transmitting device further comprises a second mounting structure that is mountable to a second shelving unit, the second shelving unit having a larger width and height than the predetermined height and width of the shelving unit, and the second mounting structure having a ground plane, a third plurality of conductive segments with each adjacent conductive segment of the third plurality is separated by a conductive segment of a fourth plurality of conductive segments. The third and fourth pluralities of conductive segments are disposed over the ground plane to form a second antenna that is configured to radiate second RF wireless power waves towards the second shelving unit such that the larger width and height of the second shelving unit is with a second coverage area of the second RF wireless power waves. A third number of conductive segments in the third plurality of conductive segments is larger than the first number of conductive segments and a fourth number of conductive segments in the fourth plurality of conductive segments is larger than the second number of conductive segments, and the second coverage area is larger than the coverage area.

In some embodiments, to create a larger coverage area more conductive segments are added. Thereby making mounting structures that have enough conductive segments to cover the entire structure of each particular shelving unit. While the example here is of two different shelving units with different mounting structures having wireless-power transmitters with different conductive segment numbers appropriate for the dimensions of those shelving units, third, fourth, fifth sixth, etc. different numbers of such mounting structures to accommodate for different shelving structures are also contemplated.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 1006 and 1034 in FIG. 10) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory optionally includes one or more storage devices remotely located from the CPU(s) (e.g., processor(s)). Memory, or alternatively the non-volatile memory device(s) within the memory, comprises a non-transitory computer readable storage medium.

Stored on any one of the machine readable medium (media), features of the present invention can be incorporated in software and/or firmware for controlling the hardware of a processing system (such as the components associated with the wireless-power transmitter 1035 and/or wireless-power receivers 1055), and for enabling a processing system to interact with other mechanisms utilizing the results of the present invention. Such software or firmware may include, but is not limited to, application code, device drivers, operating systems, and execution environments/containers.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

We claim:

1. A radio frequency (RF) wireless power circuit comprising:
   a printed circuit board (PCB);
   an antenna mounted to the PCB;
   one or more processors mounted to the PCB and configured to process signals associated with the antenna; and
   an encapsulation material that encapsulates the PCB and seals the RF wireless power circuit to liquid, wherein the encapsulation material is applied to the PCB without intervening housing and the antenna is orientation independent relative to the encapsulation material.

2. The RF wireless power circuit of claim 1, wherein the encapsulation material is resin.

3. The RF wireless power circuit of claim 1, wherein the encapsulation material is a thermoplastic elastomer wrapper.

4. The RF wireless power circuit of claim 1, wherein the RF wireless power circuit is an RF transmitter device, the RF transmitter device further comprising:
   a DC-DC power converter, a power amplifier, a local oscillator, one or more wireless communications component(s), one or more communications buses, and a memory.

5. The RF wireless power circuit of claim 1, wherein the RF wireless power circuit is an RF receiver device, the RF receiver device further comprising:
   one or more wireless communications component(s), power harvesting circuitry including a rectifier, a voltage conditioner, one or more power converter(s), one or more communications buses, and a memory.

6. The RF wireless power circuit of claim 1, further comprising:
   an external contact that extend from the RF wireless power circuit beyond the encapsulation material and establish communication to an external device, wherein the encapsulation material remains sealed to liquid around the external contact.

7. The RF wireless power circuit of claim 1, further comprising:
   a double-sided sticky strip, wherein one side of the double-sided sticky strip is attached to one face of the encapsulation material.

8. A method for producing an encapsulated radio frequency (RF) wireless power circuit comprising:
   providing a circuit including a printed circuit board (PCB) and an antenna and a processor mounted to the PCB and the processor configured to process signals associated with the antenna; and
   applying resin directly to the PCB to encapsulate the PCB without intervening housing, wherein the resin seals the RF wireless power circuit from liquid, and wherein the antenna is orientation independent relative to the resin.

9. The method of claim 8, wherein said applying further comprises:
   applying a first layer of resin to the PCB, wherein said first layer of resin encapsulates only the antenna; and
   applying a second layer of resin to the PCB, wherein said second layer of resin fully encapsulates the PCB.

10. The method of claim 9, wherein each layer of resin comprises a distinct material.

11. The method of claim 8, further comprising:
connecting external contacts to the circuit before applying the resin, wherein the external contacts extend beyond the resin and establish communication to other external devices.

12. The method of claim 8, further comprising:
attaching heat protection to the PCB, wherein the heat protection is a heat sink.

13. The method of claim 8, further comprising:
creating mounting holes through the resin, wherein the resin remains sealed to liquid.

14. The method of claim 8, further comprising:
attaching a double-sided sticky strip to one face of the encapsulated RF wireless power circuit.

15. A radio frequency (RF) wireless power circuit comprising:
a printed circuit board (PCB);
an antenna mounted to the PCB;
one or more processors mounted to the PCB configured to process signals associated with the antenna; and
a multi-layer resin encapsulation that is applied in series and a set of resin layers collectively fully encapsulate the PCB and seals the RF wireless power circuit to liquid and wherein the resin encapsulation is applied to the PCB without intervening housing, and the antenna is orientation independent relative to multi-layer the resin encapsulation.

16. The RF wireless power circuit of claim 15, wherein each layer of the multiple layers of resin comprises a distinct material.

17. The RF wireless power circuit of claim 15, wherein the application of each layer of the multi-layer resin encapsulation that is in contact with the PCB leaves a different portion of the PCB exposed as a heat tap.

18. The RF wireless power circuit of claim 15, wherein the RF wireless power circuit is an RF transmitter device, the RF transmitter device further comprising:
a DC-DC power converter, a power amplifier, a local oscillator, one or more wireless communications component(s), one or more communications buses, and a memory.

19. The RF wireless power circuit of claim 15, wherein the RF wireless power circuit is an RF receiver device, the RF receiver device further comprising:
one or more wireless communications component(s), power harvesting circuitry including a rectifier, a voltage conditioner, one or more power converter(s), one or more communications buses, and a memory.

20. The RF wireless power circuit of claim 15 further comprising:
a double-sided sticky strip, wherein one side of the double-sided sticky strip is attached to one face of the resin encapsulation.

* * * * *